(12) United States Patent
Melicher et al.

(10) Patent No.: US 12,445,476 B2
(45) Date of Patent: *Oct. 14, 2025

(54) DEOBFUSCATING AND DECLOAKING WEB-BASED MALWARE WITH ABSTRACT EXECUTION

(71) Applicant: Palo Alto Networks, Inc., Santa Clara, CA (US)

(72) Inventors: William Russell Melicher, Sunnyvale, CA (US); Oleksii Starov, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,291

(22) Filed: Mar. 19, 2024

(65) Prior Publication Data

US 2024/0259412 A1 Aug. 1, 2024

Related U.S. Application Data

(63) Continuation of application No. 17/500,308, filed on Oct. 13, 2021, now Pat. No. 11,973,780.

(Continued)

(51) Int. Cl.
*G06F 21/00* (2013.01)
*G06F 21/53* (2013.01)
*H04L 9/40* (2022.01)

(52) U.S. Cl.
CPC .......... *H04L 63/1425* (2013.01); *G06F 21/53* (2013.01); *H04L 63/0263* (2013.01); *H04L 63/1483* (2013.01)

(58) Field of Classification Search
CPC ............ H04L 63/1425; H04L 63/0263; H04L 63/1483; G06F 21/53; G06F 21/566
See application file for complete search history.

(56) References Cited

U.S. PATENT DOCUMENTS

| 7,886,043 B1 | 2/2011 | Chan |
| 8,949,660 B1 | 2/2015 | Pupius |

(Continued)

FOREIGN PATENT DOCUMENTS

| EP | 3379443 | 9/2018 |
| WO | 2017151515 | 9/2017 |

OTHER PUBLICATIONS

Blanc et al "Characterizing Obfuscated Java Script Using Abstract Syntax Tree: Experimenting with Malicious Scripts", 26th International Conference on Advanced Information Networking and Applications Workshops (Year: 2012).*

(Continued)

*Primary Examiner* — Michael M Lee
(74) *Attorney, Agent, or Firm* — Van Pelt, Yi & James LLP

(57) ABSTRACT

Techniques for deobfuscating and decloaking web-based malware with abstract execution is disclosed. In some embodiments, a system/process/computer program product for deobfuscating and decloaking web-based malware with abstract execution includes receiving a sample; performing an abstract execution of a script included in the sample; identifying the sample as malware based on the abstract execution of the script included in the sample; and generating a log of results from the abstract execution of the script included in the sample.

17 Claims, 14 Drawing Sheets

Related U.S. Application Data

(60) Provisional application No. 63/091,625, filed on Oct. 14, 2020.

(56) References Cited

U.S. PATENT DOCUMENTS

| | | | |
|---|---|---|---|
| 9,027,128 | B1 | 5/2015 | Oliver |
| 2009/0064118 | A1 | 3/2009 | Raber |
| 2014/0053056 | A1 | 2/2014 | Weber |
| 2014/0130158 | A1 | 5/2014 | Wang |
| 2015/0326599 | A1 | 11/2015 | Venu |
| 2016/0094572 | A1* | 3/2016 | Tyagi ............... G06F 21/562 726/23 |
| 2017/0195353 | A1 | 7/2017 | Taylor |
| 2017/0293477 | A1* | 10/2017 | Takata ............... G06F 21/56 |
| 2018/0300480 | A1 | 10/2018 | Sawhney |
| 2019/0132355 | A1* | 5/2019 | Egbert ............ H04L 63/1483 |
| 2019/0238566 | A1 | 8/2019 | Wang |
| 2019/0361685 | A1 | 11/2019 | Viswanath |
| 2020/0193030 | A1 | 6/2020 | Ikeda |

OTHER PUBLICATIONS

You et al., Malware Obfuscation Techniques: A Brief Survey, 2010 International Conference on Broadband, Wireless Computing, Communication and Applications, IEEE 2010, pp. 297-300.
Andra Zaharia, JavaScript Malware—A Growing Trend Explained for Everyday Users, 2016.
Author Unknown, Free Javascript Obfuscator Online, 2016.
Author Unknown, JSFuck: Write Any JavaScript With 6 Characters, Retrieved on Sep. 30, 2021.
Ben Hunter, ViperSoftX—New JavaScript Threat, Fortinet, Feb. 14, 2020.
Canali et al., Prophiler: A Fast Filter for the Large-scale Detection of Malicious Web Pages, HAL Archives, Sep. 3, 2012.
Capacitorset et al., A Tool For Studying JavaScript Malware, 2020.
Chen et al., Towards an Understanding of Anti-Virtualization and Anti-Debugging Behavior in Modern Malware, 2008.
Curtsinger et al., Zozzle: Fast and Precise In-Browser JavaScript Malware Detection, 2011.
Datacamp, prop.test: Test of Equal or Given Proportions, prop.test function, RDocumentation, Retrieved on Sep. 30, 2021.
Edwin B. Wilson, Probable Inference, The Law of Succession, and Statistical Inference, Journal of the American Statistical Association, pp. 209, 1927.
Fass et al., Hidenoseek: Camouflaging Malicious JavaScript in Benign AST's, ACM, 2019.
Fass et al., JAST: Fully Syntactic Detection of Malicious (Obfuscated) JavaScript, 2018.
Fass et al., JSTAP: A Static Pre-Filter for Malicious JavaScript Detection, ACSAC, 2019.
Github, JavaScript Obfuscator, Retrieved on Sep. 30, 2021.
Github, Obfuscate JavaScript (beyond repair) With Ruby, Retrieved on Sep. 30, 2021.
Github, Repository of Yara Rules, Retrieved on Sep. 30, 2021.
Github, Secure and Isolated JS Environments for Nodejs, Retrieved on Sep. 30, 2021.
Google, Closure Compiler, Google Developers, 2020.
Guy Bary, Analyzing Magecart Malware—From Zero to Hero, Tech Blog, Jan. 15, 2020.
Hu et al., "JSForce: A Forced Execution Engine for Malicious JavaScript Detection", Jan. 2017.
Invernizza et al., Cloak of Visibility: Detecting When machines Browse A Different Web, IEEE, May 2017.
javascriptobfuscator.com, The Most Secure Way to Protect JavaScript Code, JavaScript Obfuscator: Protects JavaScript Code From Stealing and Shrinks Size, Retrieved on Sep. 30, 2021.
Kaplan et al., "NOFUS: Automatically Detecting" + String. fromCharCode(32) + "ObFUSCateD".toLowerCase() + "JavaScript Code", Microsoft Research Technical Report, 2011.
Kapravelos et al., Hulk: Eliciting Malicious Behavior in Browser Extensions, 23rd USENIX Security Symposium, pp. 641-654, 2014.
Kapravelos et al., Revolver: An Automated Approach to the Detection of Evasive Web-based Malware, 22nd USENIX Security Symposium, pp. 637-651, 2013.
Kim et al., J-Force: Forced Execution on JavaScript, IW3C2, pp. 897-906, 2017.
Kolbitsch et al., Rozzle: De-Cloaking Internet Malware, Microsoft Research Technical Report, pp. 1-21, Oct. 25, 2011.
Lekies et al., The Unexpected Dangers of Dynamic JavaScript, 24th USENIX Security Symposium, Aug. 2015.
Li et al., SymJS: Automatic Symbolic Testing of JavaScript Web Applications, FSE, 2014.
Likarish et al., Obfuscated Malicious JavaScript Detection using Classification Techniques, pp. 1-8, 2009.
Lu et al., Automatic Simplification of Obfuscated JavaScript Code: A Semantics-Based Approach, Department of Computer Science, University of Arizona, 2012.
Luke Leal, Malicious JavaScript Used in WP Site/Home URL Redirects, Jan. 21, 2020.
Papernot et al., The Limitations of Deep Learning in Adversarial Settings, Retrieved from arXiv: 1511.07528v1, Nov. 24, 2015.
Paul Ducklin, Ransomware in Your Inbox: the rise of malicious JavaScript attachments, Apr. 26, 2016.
Pochat et al., "Tranco: A Research-Oriented Top Sites Ranking Hardened Against Manipulation", Dec. 17, 2018.
Richards et al, The Eval That Men Do: A Large-Scale Study of the Use of Eval in JavaScript Applications, 2011.
Security News, JavaScript Malware in Spam Spreads Ransomware, Miners, Spyware, Worm, Retrieved on Sep. 30, 2021.
Sen et al., Jalangi: A Selective Record-Replay and Dynamic Analysis Framework for JavaScript, ESEC/FSE, 2013.
Serafim et al., JavaScript Obfuscator Tool, Retrieved on Sep. 30, 2021.
Sommer et al., Outside the Closed World: On Using Machine Learning For Network Intrusion Detection, IEEE, 2010.
Sophos, JavaScript Malware Finds New Life, JavaScript Malware Attacks, Securing Java With Advanced Threat Protection, Retrieved on Sep. 30, 2021.
Stefano Di Paola, Advanced JS Deobfuscation Via AST and Partial Evaluation (Google Talk WrapUp), IMG Minded Security Blog, Oct. 28, 2015.
Stock et al., "Kizzle: A signature compiler for exploit kits". In International Conference on Dependable Systems and Networks (DSN). Feb. 2015.
Suciu et al., Exploring Adversarial Examples in Malware Detection, IEEE SPW, 2019.
Tang et al., Dual-Force: Understanding WebView Malware via Cross-Language Forced Execution, ACM, pp. 714-725, 2018.
Tellenbach et al., Detecting Obfuscated JavaScripts from Known and Unknown Obfuscators using Machine Learning, 2017.
Wang et al., A deep learning approach for detecting malicious JavaScript code. Security and Communication Networks Security Comm. Networks 2016; 9:1520-1534, Published online Feb. 11, 2016 in Wiley Online Library (wileyonlinelibrary.com) DOI: 10.1002/sec.1441.
Wang et al., JSDC: A Hybrid Approach for JavaScript Malware Detection and Classification, ACM, pp. 109-120, 2015.
Xu et al., JStill: Mostly Static Detection of Obfuscated Malicious JavaScript Code, CODASPY, 2013.
Xu et al., The Power of Obfuscation Techniques in Malicious JavaScript Code: A Measurement Study, 2012.

* cited by examiner

|  | Static analysis | Dynamic analysis | Forced execution | Abstract interp. |
|---|---|---|---|---|
| Obfuscation | ✗ | ✓ | ✓ | ✓ |
| Soundness | ✗ | ✓ | ✓ | ✓ |
| Performance | ✓ | ✗ | ✗ | ✓ |
| Code coverage | ✓ | ✗ | ✓ | ✓ |
| Standalone analysis | ✓ | ✗ | ✗ | ✓ |

TABLE I: High-level summary of the tradeoffs of different analysis methods. Check marks mean that the analysis has good analysis properties for that row. Xs mean that the analysis has bad analysis properties. Soundness in this case means a lack of false positives.

FIG. 8

```
1  var ae29861-"data : image/ jpg; base64, 231f474a5503...91
     f0c474a551d29--" ; for (var i-24; i<ae29861.length
     |-2; i+-2) document.write (String.fromCharCode (
     parseInt (ae29861 [ i ]+" "+ae29861 [ i+1 ], 16) ^parseInt
     (ae29861 [ 22 ] +" "+ae29861 [ 23 ],16) ) ) ;
```

(a) Example of an obfuscated malware packer. A sample of malware that unpacks itself by hiding inside a string that claims to be a base64 image. The ellipsis replaced the payload.

```
1  /* check if the user has visited previously */
2  function _vr_c (k) {return (document.cookie.match ('(^ |;
      ) '+k+'- ([ ^; ] *)') | |0) [2] )
3  function _vc_c (name, value, d) {var date-new Date ( )
      ;...; document.cookie - name+"-"+value+"; expires
      -"+...+"; path=/"; }
4  /* check if victim server is mil, gov, or edu */
5  function _vtst (c, v, t) {if (_vr_c (c) ---undefined) {_vc_c
      (c, v, t); if(_vr_c (c)--v) if (window.location.
      hostname.split ('.') .pop ( ). search (/edu|gov|mil/)
      <0) return true; } return false; )
6  try (var _vu_u-"...", _vu_i-"...";
7  /* if referrer hostname matches the server */
8  if (document . referrer) {if (document.referrer.match
      (/ :V V (.[^/]+)/) [1] !- window.location.href.
      match(/ :V V (.[^/]+)/) [1]) {
9  */ check for user agent OS and browser */
10 if (navigator.appVersion.indexOf ("Win")---1) {if(_vtst
      (_vu_u+"_1",_vu_i, 14)) {
11    /* redirect to malicious website */
12    window.location.href-"http://...";
13 } }else{if(navigator.appVersion.indexOf ("Chrome") >0
      || navigator.userAgent.indexOf ("Firefox") >0) {var
      _vu_3- _vr_c (_vu_u+"_3"); if (_vtst (_vu_u+"_2",
      _vu_i,14) || _vu_3 > 0) { } } } } }
14 } finally { }
```

(b) Deobfuscated malware payload from 2a. This sample uses a number of evasive environment checks against: cookie state, referrer, victim server top level domain, OS and user agent. Some details are omitted or replaced with ellipsis for space. Whitespace and comments were added for clarity.

FIG. 9

| Value Type | Examples |
|---|---|
| Concrete values | 0, "astring", true, null |
| Typed values | *Unknown type, string type, integer type* |
| Option values | 0 or 1. "astring" or undefined |
| Prefix strings | string with prefix "http://bad.com/" |
| Heap objects | {"test" : 1 or 2}, [0, 1, *Unknown value*] |
| JS functions | function (a, b) {return a + b} |
| Native functions | eval, Function, setTimeout |

TABLE II: List of abstract value types in our JavaScript implementation with examples.

FIG. 10

|  | Pre-2020 | Late-2020 |
|---|---|---|
| Number manually analyzed | 93 | 98 |
| Code generation obfuscation | 86% | 69% |
| Success rate | 86% | 98% |
| One-sided 95% confidence interval | 78% | 93% |

TABLE III: Summary statistics for deobfuscation success in our manually analyzed dataset.

FIG. 12

DEOBFUSCATING AND DECLOAKING WEB-BASED MALWARE WITH ABSTRACT EXECUTION

CROSS REFERENCE TO OTHER APPLICATIONS

This application is a continuation of U.S. patent application Ser. No. 17/500,308, entitled DEOBFUSCATING AND DECLOAKING WEB-BASED MALWARE WITH ABSTRACT EXECUTION filed Oct. 13, 2021 which is incorporated herein by reference for all purposes, which claims priority to U.S. Provisional Patent Application No. 63/091,625 entitled DEOBFUSCATING AND DECLOAKING WEB-BASED MALWARE WITH ABSTRACT EXECUTION filed Oct. 14, 2020, which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 8 illustrates Table I.

FIG. 9 is an example of evasive malware.

FIG. 10 illustrates Table II.

FIG. 12 illustrates Table III.

DETAILED DESCRIPTION

Figure 1:
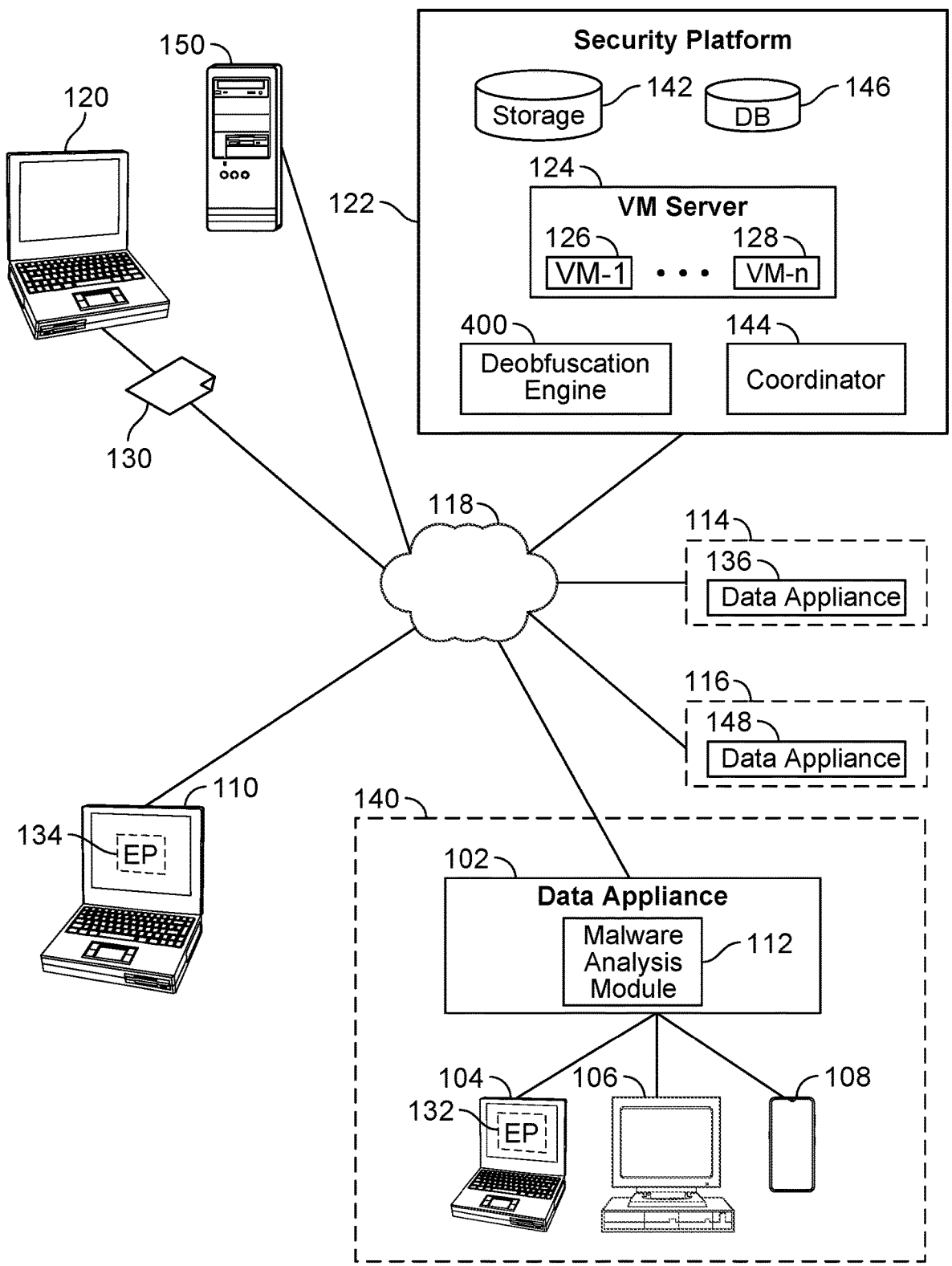
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. OVERVIEW

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. EXAMPLE ENVIRONMENT

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe"), can also be an independent component of another application (e.g., a mobile advertisement SDK or library embedded within the calculator app), and can also be an executable portion of web-based content, such as an executable script (e.g., JavaScript or another scripting/programming language) included within a web page such as further described below.

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. An example of malware is a malicious website that includes obfuscated JavaScript for performing unwanted or malicious activities on a user's computing device (e.g., computer, laptop, smart phone, etc.). Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
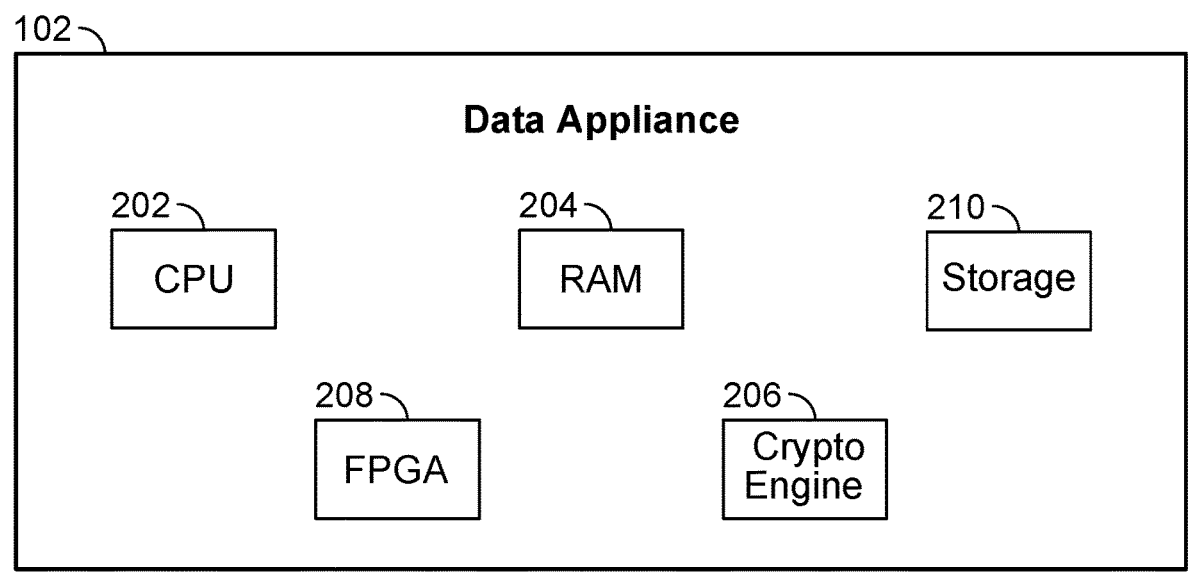
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
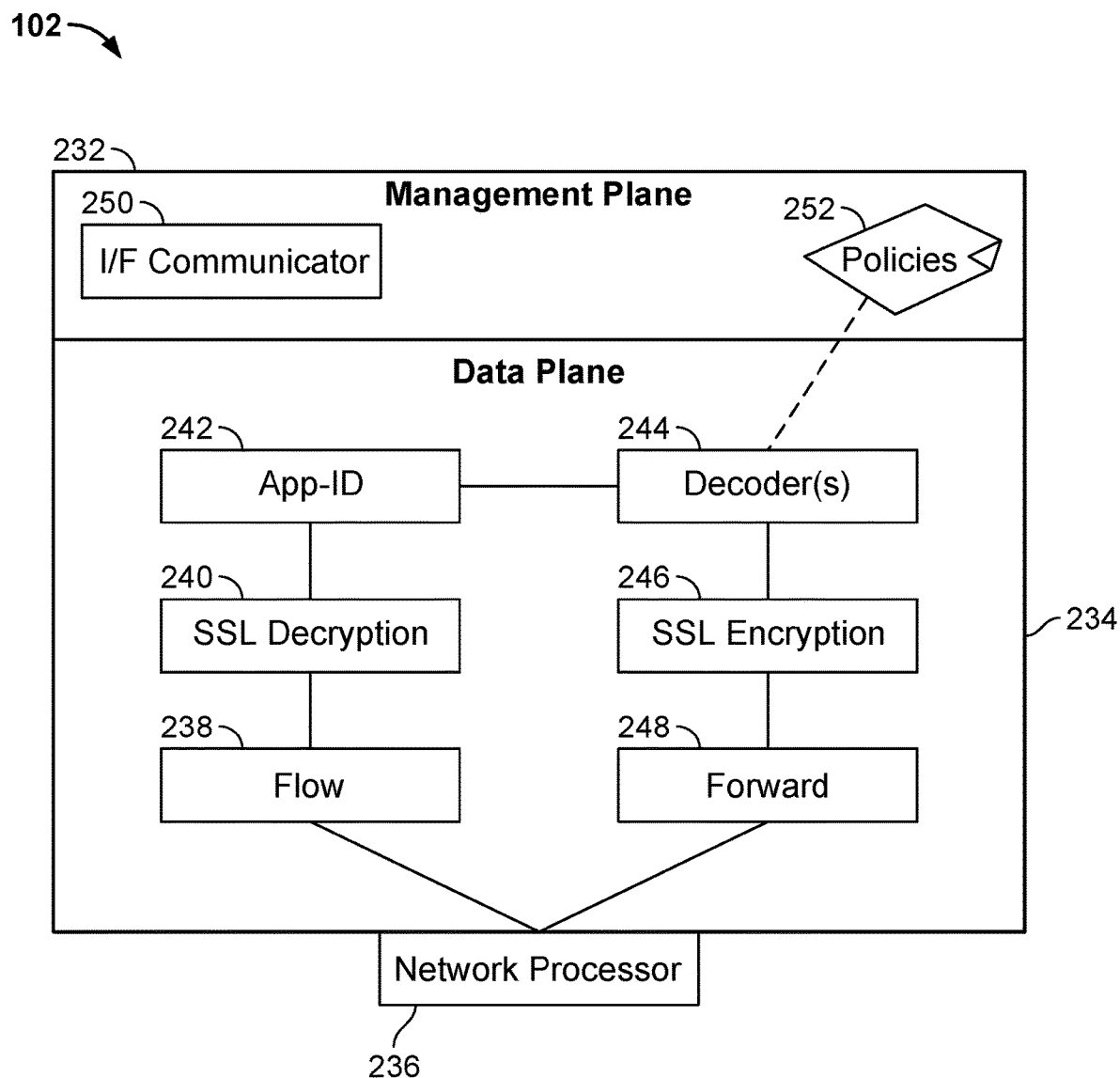
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244.

Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. SECURITY PLATFORM

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144. In some embodiments, security platform 122 performs malware analysis of samples using a deobfuscation engine 400 for deobfuscating and decloaking web-based malware with abstract execution as will be further described below with respect to various embodiments.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. ANALYZING SAMPLES USING STATIC/DYNAMIC ANALYSIS

Figure 3:
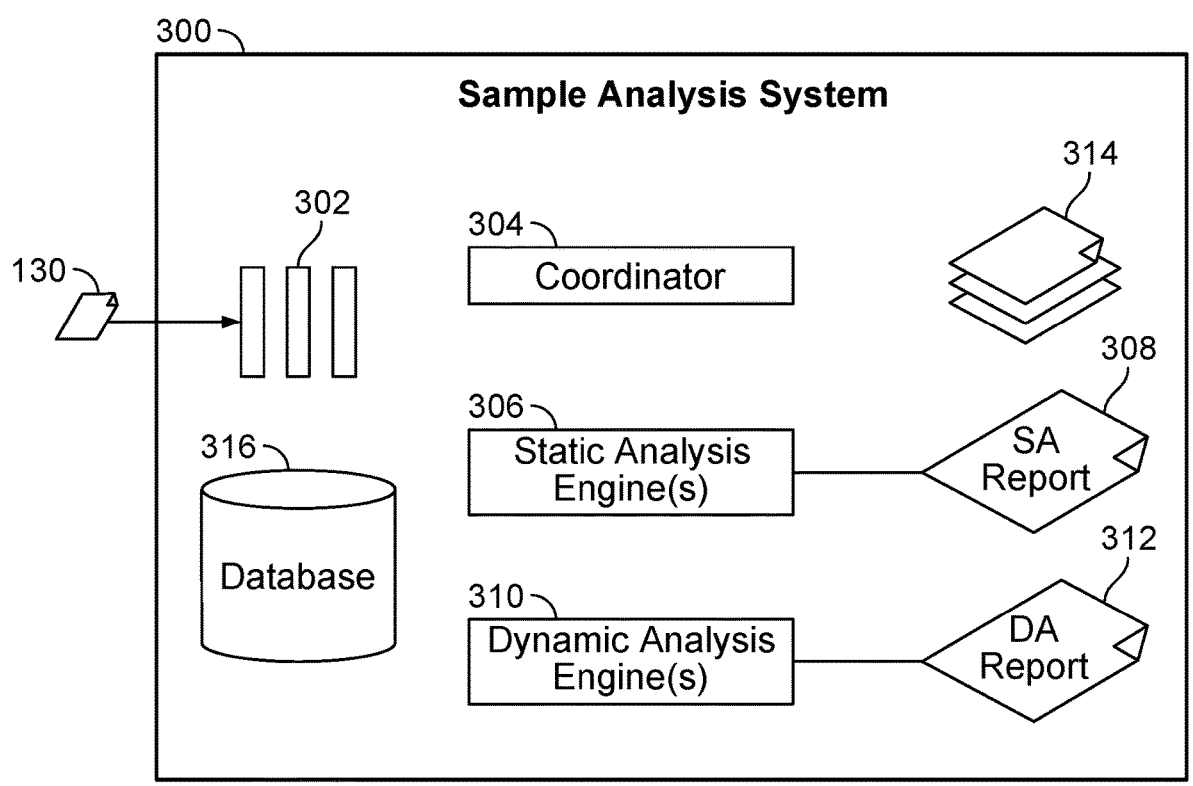
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. DEOBFUSCATING AND DECLOAKING MALWARE USING ABSTRACT EXECUTION

As mentioned above, malicious individuals continually look for new ways to prevent security infrastructure from detecting the malicious nature of their malware. One frequently used approach is for a malware author to obfuscate a given piece of malware (often with subtle differences), so that while a first signature (e.g., stored in database 146 and usable by data appliance 102) might successfully flag a first piece of malware as malicious, the same signature will not match a new variant of the malware that is obfuscated and the new malware variant will go undetected (e.g., by data appliance 102). Moreover, traditional dynamic analysis is less effective in detecting such malware as further described here. One way of combating this technique is for security platform 122 to use the disclosed deobfuscating and decloaking of web-based malware with abstract execution as will now be described with respect to various embodiments.

For example, malicious JavaScript code often uses obfuscation and client-side cloaking to avoid detection. Current analysis aiming to defeat such evasions have significant tradeoffs: static analysis can have practical advantages, but typically handles obfuscation poorly; in contrast, dynamic analysis can analyze obfuscated malware, but can be heavyweight and suffers from code-coverage issues, missing, for example, cases that require specific user interaction or that use client-side cloaking. We present a static analysis based on abstract interpretation-a technique to simulate execution over multiple paths-focusing on deobfuscating and decloaking malware. By collecting datasets of labeled JavaScript malware samples, we show that it can deobfuscate 86%-98% of malicious samples based on manual analysis. Furthermore, by using in-the-wild measurements, we found that the disclosed techniques of deobfuscating and decloaking of web-based malware with abstract execution can detect novel, previously undetected malware. Our approach can integrate well with other static analysis methods by providing deobfuscated JavaScript for further analysis. We demonstrate one specific application of our deobfuscation engine, detecting malicious link droppers, showing that it can detect 15% more malware samples than state-of-the-art industrial dynamic and static methods. These additional detections are among the most difficult to identify using existing methods because they use virtualization evasion techniques or require specific human interaction to reveal malicious payloads. Finally, we show how our approach is efficient enough for use as a network inline defense, responding on average in 36 ms to deobfuscate 58%-81% of malware.

1. Introduction

JavaScript malware remains a growing problem on the web. Ransomware, coin miners, spyware, web-based worms, credit card skimmers, exploit kits, malvertising, redirection campaigns, phishing campaigns, scam campaigns, drive-by-downloads, and other types of JavaScript-based malware continue to harm Internet users and are growing more common [1]-[7].

Malware frequently uses obfuscation—and with good reason, as obfuscation is effective at evading common anti-virus and firewall filtering [8]. JavaScript is already a difficult language to statically analyze due to its dynamic nature [9], [10], but obfuscation intentionally makes analysis more difficult for automated methods to analyze and for performing manual analysis [8], [11], [12]. At the same time, obfuscation can be relatively simple for an attacker to implement compared to the resources that defenders must exert to analyze malware—there are many off-the-shelf obfuscation methods readily available [13]-[19]. Code randomization, using dynamic code generation, obfuscation layering, and the sheer variety of obfuscation methods make it difficult to write special purpose analyses targeting a specific packer or obfuscation method [11], [12]. While malware commonly uses obfuscation, using obfuscation does not imply that code is malware [8]; benign reasons for obfuscation include code minification to decrease the website size, hiding email addresses from automated scanning, blocking reverse engineering, or hiding adult content [8], [11]. Because obfuscation is not specific to malware, it is impractical to rely on obfuscation as a proxy for maliciousness, and it is crucial to have a deep understanding of obfuscated code to precisely detect malware.

In order to detect malware, program analysis techniques are used to identify malicious code among the vast majority of benign code. Static analysis is often defeated by complex obfuscation [8], [11] and other adversarial code modifications [20], [21], and can lack precision, but it can approximate reasoning about all code paths. Dynamic analysis can handle most obfuscation, but suffers from code-coverage gaps: malicious code can use client-side evasions to avoid detection [22], and some code paths require specific user interaction [23]. Furthermore, dynamic analysis has a variety of practical drawbacks—analysis is computationally expensive at scale and it cannot analyze standalone scripts, instead requiring a full web page to execute. Current efforts to improve code coverage of dynamic analysis using either forced or concolic execution can further exacerbate the problem of resource usage by 2-10,000× [24]-[28]. Additionally, forcing execution can unintentionally modify server-side state, which has both practical and ethical drawbacks. For example, it may unintentionally unsubscribe users from mailing lists when analyzing URLs from emails.

The disclosed techniques facilitate deobfuscating heavily obfuscated malicious web-based JavaScript that uses static and dynamic evasions. For example, we explore two use cases for our analysis in this work: (1) offline, ahead-of-time malware detection; and (2) in-transit detection on the network. Each use case generally should be capable of operating at a large volume, processing on the order of many tens of millions of scripts per day, which requires strict performance criteria, and for inline defense, low analysis latency. Furthermore, our analysis generally should operate on in-the-wild traffic distribution where the vast majority of traffic is benign. This operating point generally should comply with extremely low false positive rates—for example, at a rate of $10^{-6}$, we would still upset hundreds of users each day.

To achieve our goal, we chose the approach of implementing a static analysis based on abstract interpretation. Our analysis is able to approximate execution over all possible code paths, decloaking malware that is only activated by specific user-interaction or that uses client-side evasions. At the same time, we find that our analysis is able to deobfuscate 86%-98% of malware, compared to 8%-44% for other JavaScript static analyses [29], [30]. Additionally, we create an example application for our deobfuscation engine, finding that it contributes to novel malware detections by identifying malicious URLs that the script may contact. Our analysis increases detection capability by 15% over our existing static and dynamic detection capability. Because our analysis outputs deobfuscated JavaScript (e.g., and the disclosed techniques can be similarly applied to other programming/interpreted languages, such as Perl, VBScript, Python, shell, etc.), it integrates well with other static analysis methods—for example, by running static signatures on deobfuscated content or by using machine learning methods on deobfuscated JavaScript. We also show how our approach is efficient enough to provide results for low-latency inline defenses, providing a response in an average of 36 ms for 58%-81% of malware with reasonable resource usage (e.g., such as example resources used in performing different tests as described further below), and having the ability to analyze standalone scripts outside of a complete web page.

In Section 2, we describe background related to web-based JavaScript malware analysis. Next, we describe the design of our abstract analysis of JavaScript in Section 3. We describe our methodology for collecting our malware datasets in Section 6. We present our results for deobfuscating and detecting malicious JavaScript in Section 7 and discuss and interpret our results in Section 8. Finally, we describe the conclusions and areas of future work in Section 9.

2. Background

In this section, we describe prior research on static (Section 2-A) and dynamic (Section 2-B) analysis techniques for detecting JavaScript malware and managing obfuscation. We summarize the tradeoffs in Table I as shown in FIG. 8.

A. Static Analysis

Static analysis of code examines source code as a static artifact. In general, static analyses have more difficulty overcoming obfuscation [8], [10], [11] and other adversarial code manipulation [20], than dynamic methods. However, static methods are capable of providing verdicts about all code paths, whereas dynamic methods suffer from issues of code coverage. Static analyses can also have other practical benefits-they can analyze standalone code outside of a web page and can be more light-weight. The capability of analyzing standalone scripts allows analyses to do more efficient caching-popular scripts can be cached and analyzed on their own—and allows for inline on-the-network defenses that only have access to one specific script. We will consider three different types of static analyses that are commonly used in practice: signature-based mechanisms, machine-learning and statistically driven analysis, and analysis based on modeling program behavior. Finally, we present background on our approach of abstract interpretation.

a) Static signatures: Signature-based static analyses are among the least sophisticated analysis, but are often effective in practice for detecting common attacks, but can be easily defeated by obfuscation, randomization, and encryption [8]. Yara rules are a popular implementation of writing content-based signatures and scanning for signature matches used in malware analysis [31]. A typical workflow for signature-based detection is for a security researcher to manual analyze malware, then write a signature to detect it. Signatures used in this way can act as a force multiplier for manual analysis, automating further analysis. When compared to other methods, the benefit is that, because the author manually examines malware in detail, signatures can have excellent error characteristics-false positives and false negatives are ruled out by careful manual tuning of the signature. However, signature writing is an expensive process requiring many hours of analysis by highly skilled security researchers. Automated signature extraction can help reduce the manual effort required for writing and maintaining signatures [32]. But still, signatures are often easily evaded by malware authors—for some particularly polymorphic, randomized malware, or for fully encrypted malware, it may not be possible to write effective signatures.

b) Machine-learning: Approaches based on machine learning and statistics have recently become particularly in vogue in the field of web-based malware analysis [20], [33]-[39]. Such approaches attempt to leverage statistical similarity between malware variants to tease out patterns that indicate malicious code. Researchers can handcraft features that are extracted from source code or operate on the raw text to classify malware. Machine learning methods, in general, have systemic errors for classifying malware: specially crafted adversarial examples can evade detection [20], [21]; false positive rates are often too high for use in high-volume, unbalanced classifications tasks in the wild [40]. The challenge of high volume, unbalanced classification requires that, in order to be practically useful, machine learning models typically must use strict classification thresholds to limit the impact of false positives. For example, a target false positive rate of $10^{-6}$ would still have hundreds of false positives each day, when classifying hundreds of millions of samples per day, the vast majority of which are benign.

While static machine learning models over obfuscated samples may identify useful features (i.e., obfuscation techniques used by only malicious scripts), such models need frequent updates to reflect the distribution of those obfuscated techniques among malicious and benign samples in the wild. Indeed, benign obfuscated code is common enough in typical traffic to harm detection accuracy of models that rely on using obfuscation as a proxy for maliciousness [8]. Worse, even unsophisticated and common "append" attacks—an example of adversarial evasion—where a small malicious payload is washed out by larger benign content, can significantly affect verdict quality [20], [41]. However, despite these drawbacks, machine learning models are highly scalable. Indeed, these models can generalize such that they can detect polymorphic malware variations without the need for manual analysis.

c) Program behavior: Analyses based on modeling program behavior aim to understand code at a logical level. For JavaScript malware analysis, such analyses are often limited by the dynamic nature of the JavaScript language [9], and the use of obfuscation [8], [11]. Semantic analyses aim to better handle obfuscated code. In practice, semantic analyses can have both false positives and false negatives.

Some methods focus on identifying similarities and differences in abstract syntax trees [23], [42]. JStill aims to statically detect the presence of suspicious function invocations that indicate obfuscation [43]. Other work uses hybrid static and dynamic analysis to detect vulnerable web pages and reduce the number of false reports generated by static analysis [44]. Because of the dynamic nature of JavaScript, many static analysis techniques partially use dynamic execution [23], [29], [42]-[44].

JStillery, a recent, practical deobfuscation tool, attempts to statically deobfuscate abstract syntax trees through simplifying transformations [29]. JStillery also uses partial dynamic evaluation for small snippets, but is for the most part static-centered analysis. We compare our analysis to JStillery in Section 7-A; we chose JStillery because it is the closest practical, recently updated tool to fit our niche of static analysis of standalone, web-based JavaScript at scale.

B. Dynamic Analysis

Dynamic analyses execute potentially malicious code in an instrumented environment to collect behaviors and classify malicious code. Such analyses can defeat deobfuscation, because they can emulate the victim's environment and malware must unpack itself on victim machines to deploy its payload [43]. However, in general, dynamic analysis is resource-intensive, unable to achieve full code coverage, and cannot analyze standalone scripts, but instead must analyze web pages. When dynamic analysis attempts to instrument standalone scripts, it can encounter errors during execution because of relying on functionality defined in other scripts. Methods to achieve higher code coverage are even more costly and have high risk of modifying server-side web application state in undesirable ways for users [24]-[28], [45].

Some malware requires specific user interaction in order to deploy their payload; some malware can probe its environment and cloak its actions when it is being instrumented—for example, by checking the browser's user-agent [46]. We measure some of the impact that such client-side evasions have by comparing our new abstract-interpretation analysis to our existing dynamic analysis engine in Sections 7-B and 8-A. In the context of malicious JavaScript on the web, dynamic analysis often requires visiting the web page, parsing, executing multiple files with HTML and JavaScript and then waiting for the web page to complete loading—making dynamic analysis significantly more heavy than static analysis techniques.

Due to the code-coverage limitations of dynamic analysis, different techniques have been created to explore more code paths. Ad hoc techniques such as fuzzing and manually triggering event handlers on pages can be used to increase code coverage over multiple paths [45]. Precise constraint solving in concert with concrete execution and symbolic execution, called concolic execution, can logically craft specific inputs that guide execution down different paths [24], [25], though at a cost of 10-10,000× overhead. Recent work improves on this technique, forcing execution down all code paths by modifying the JavaScript engine, which sacrifices analysis precision for better performance [26]-[28]. While these analyses have high fidelity, they still add significant overhead of 2-8× [26] onto already heavy-weight dynamic analysis. Furthermore, forcing execution can have the unfortunate side effect of changing server-side state of web applications; for example, by automatically clicking an unsubscribe button-a clearly undesirable side-effect, which raises ethical and practical concerns of crawling URLs from real web history. Additionally, modifying server-side can also have negative effects for malware analysis—it can cause common, one-time malware pages to be unusable for further analysis and it can alert malware authors to analysis. We describe more differences in analysis between forced execution and our technique in Section 8-A2.

Because of the high resource consumption of dynamic analysis, prior work has introduced the idea of a static prefilter, that uses machine-learning to identify suspicious looking, but not confirmed malicious code. Samples that are flagged as suspicious by the prefilter may be subjected to further, more heavy-weight analysis [47], [48].

C. Abstract Interpretation

Abstract interpretation is another general technique for statically analyzing programs. It is almost not fair to consider it a static technique, given that much of the "static" analysis that happens is modeling concrete execution. In general, abstract interpretation, as opposed to concrete interpretation, attempts to execute programs using abstract values and to approximate execution down all possible code paths. This property enables analyses powered by abstract interpretation to deobfuscate malware with high fidelity, while at the same time, approximating complete code coverage. However, abstract interpretation can fail to precisely analyze code due to state-explosion, when too many paths are explored, or the analysis cannot statically determine precise state. As described herein, we show that such performance degradation does not often occur (or can be omitted) for the majority of JS malware.

Similar techniques are used for abstract interpretation in Rozzle [49]. Rozzle is a multi-execution engine for JavaScript built into a JavaScript interpreter, especially targeting malware that probes its execution environment. During JavaScript execution, Rozzle maintains a symbolic value for each concrete JavaScript value tree that concretizes when interacting with external systems. As an example, our disclosed techniques differ from Rozzle in our analysis engine's symbolic instrumentation: different symbolic models; forcing execution down paths that require user interaction; preventing server-side interaction; doing speculative, in-memory decoding; and being more tolerant of undefined functions and errors, which previous work has shown can be significant for detecting malware [28]. Furthermore, our analysis is built outside of the web browser, allowing us to: target lightweight, standalone script analysis. We describe differences in analysis between Rozzle and our disclosed techniques in more detail in Section 8-A2.

Abstract interpretation was also used to detect malware in the context of JavaScript embedded in PDF documents [50]. While that work also uses abstract interpretation, their implementation yielded more false positives, 1.3% more than their comparison approaches based on machine learning. For our use case of high-volume, unbalanced classification, we are targeting zero false positives, making their technique too aggressive. The primary reasons for their high false positive rate are the following: treating any deviation from expected behavior as malicious, and using the presences of suspicious functions, like eval, as evidence of malware. In the context of analysis on the web, such analysis would yield too many false positives to be practical, since many benign websites exhibit such behavior [8], [11]. For these reasons, we believe our techniques with the goal of low false positives when presented with incredibly varied web pages that may do unexpected things, to be a significantly novel point in the design space with different implementation artifacts as further described herein.

3. Deobfuscation Engine Design

As disclosed herein, our abstract interpreter is designed to execute code differently than a normal concrete interpreter because we approximate execution across all program paths. At a high level, our execution model is that the execution engine takes as input an immutable program state and an instruction to execute (e.g., an assignment expression or binary operation). The execution engine then computes the resulting program state after the instruction has been executed. Our dataflow analysis algorithm decides which instructions to execute and stores the program state after each instruction. It also decides when control flow should branch, creating two separate program states, and when two states that had previously branched should merge together.

Figure 4:
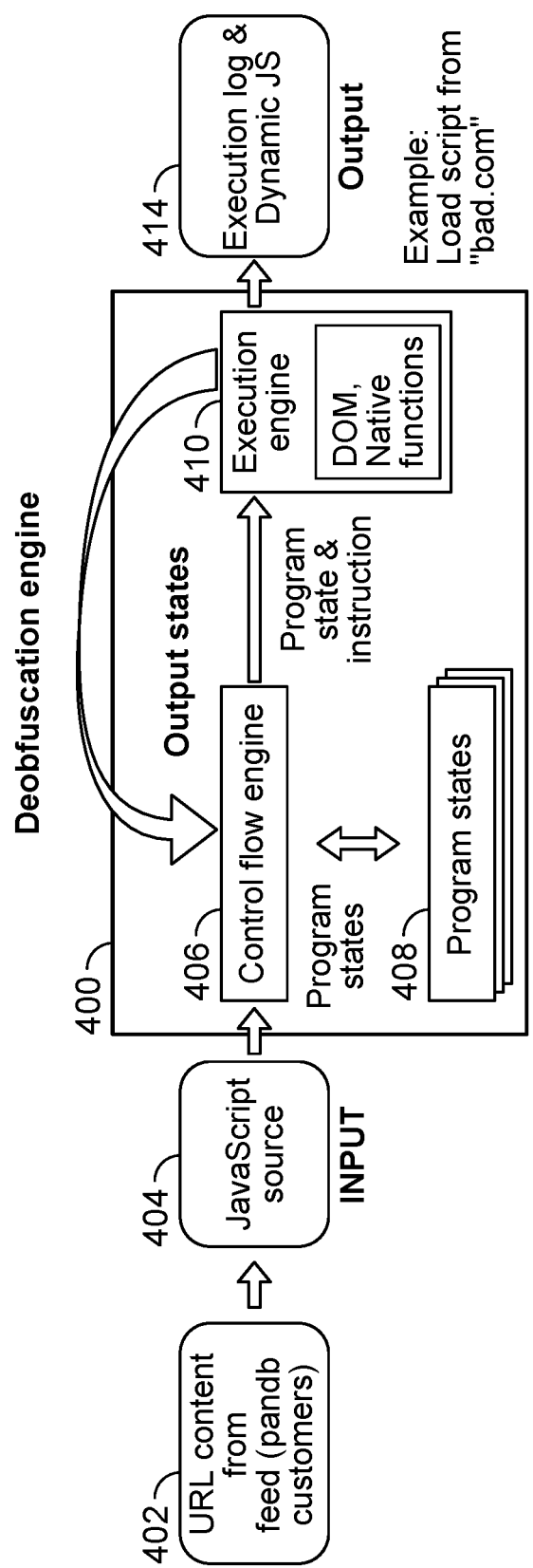
FIG. 4 illustrates an example of an embodiment of a deobfuscation engine for deobfuscating and decloaking web-based malware with abstract execution.

FIG. 4 illustrates an example of an embodiment of a deobfuscation engine for deobfuscating and decloaking web-based malware with abstract execution in accordance with some embodiments. Specifically, FIG. 4 is a high-level design diagram of our abstract interpreter. Our control flow engine guides the execution path, sending input program states and instructions to the execution engine. The execution engine returns a new program state, which becomes the input states to subsequent instructions.

Referring to FIG. 4, a high level diagram of our design is shown in FIG. 4. As shown, a deobfuscation engine 400 takes as input JavaScript source code 404 (e.g., from a URL content feed 402 for security customers), which may be benign or malicious, and produces an execution log 414 as output, which includes any dynamically executed JavaScript code, for example, by eval or by document.write.

In an example implementation, our analysis is implemented in JavaScript using Node.js. It takes JavaScript code as input (404), then parses the code, performs passes on the abstract syntax tree to identify scopes, variables and functions using a control flow engine 406. Then our analysis does a quick pass to identify speculative deobfuscation opportunities without full execution modeling, identifying, for example, base64 encoded DOM snippets or URLs. Finally, our analysis begins modeling program execution with abstract values using an execution engine 410. During execution, if we detect dynamic code execution (e.g., via eval, or document.write), then we recursively parse, extract an AST, and model execution of it as if it had been executed. Because we simulate all execution paths, our analysis can deobfuscate code that uses multiple layers of obfuscation. Analysis is complete when all code paths have been executed (e.g., shown as program states at 408), or optionally after a set timeout, whichever occurs first.

Figure 5:
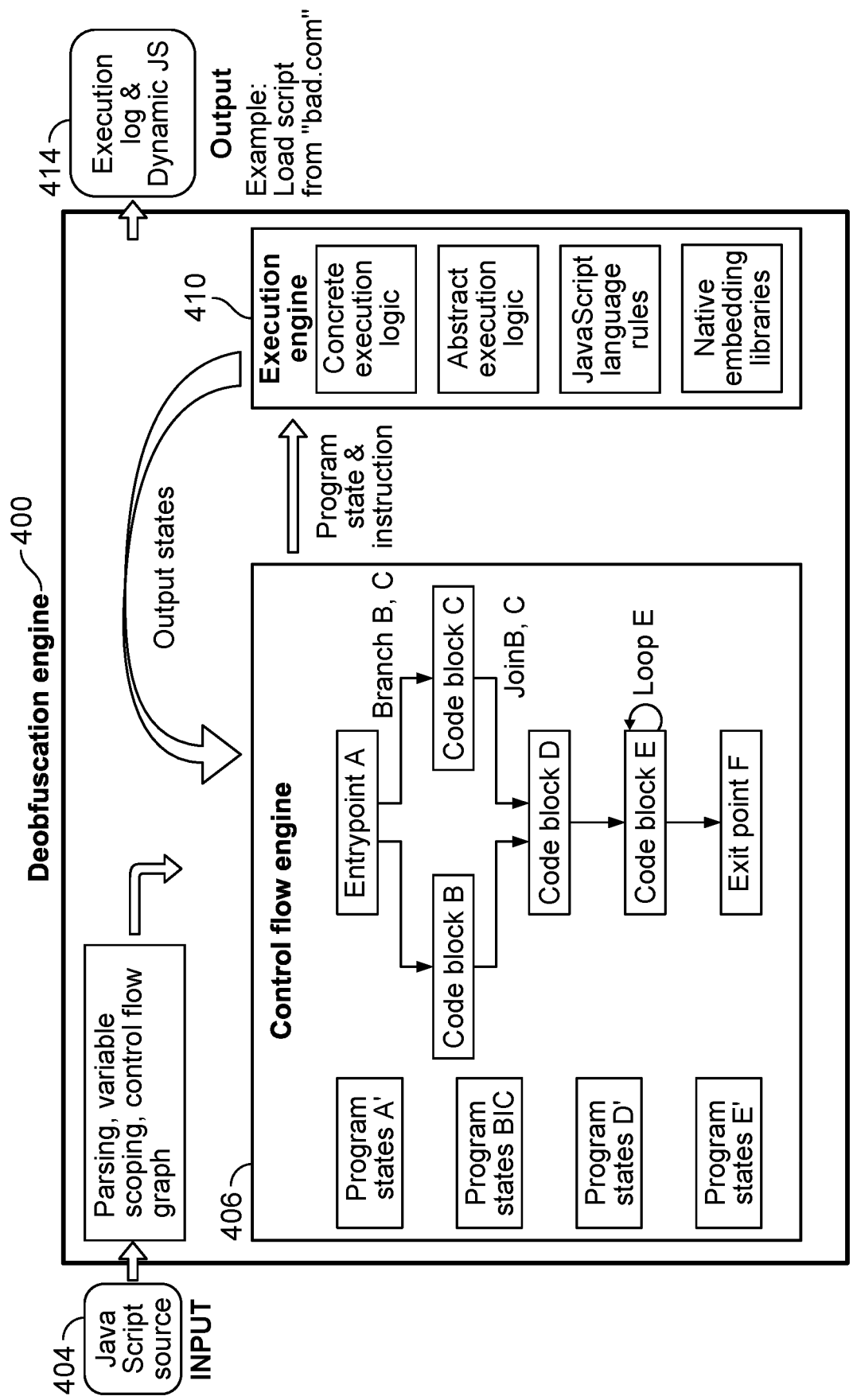
FIG. 5 illustrates another example of an embodiment of a deobfuscation engine for deobfuscating and decloaking web-based malware with abstract execution.

FIG. 5 illustrates another example of an embodiment of a deobfuscation engine for deobfuscating and decloaking web-based malware with abstract execution in accordance with some embodiments. Specifically, FIG. 5 is another high-level design diagram of our abstract interpreter as similarly shown and described above with respect to FIG. 4. Our control flow engine (406) guides the execution path, sending input program states and instructions to the execution engine. The execution engine (410) returns a new program state (e.g., Program states A', B|C, D', and E' as shown in FIG. 5), which becomes the input states to subsequent instructions. As also shown in FIG. 5, the control flow engine (406) can process different branches, joins, and loops, such as will be further described below. Finally, the execution engine (410) can perform concrete execution logic, abstract execution logic, JavaScript language rules, and native embedding libraries, such as will be further described below.

First, we discuss a motivating example to illustrate our design choices in Section 3-A. We describe how our abstract interpreter models data types and simple operations on those data types in Section 3-B. Then, we describe how our abstract interpreter maintains program state across all possible execution paths in Section 3-C. Next, we describe how our abstract interpreter manages control flow by simulating execution along different paths in Section 3-D. Finally, we describe more details of our analysis implementation in Section 3-E.

A. Motivating Example

Our main goal for this analysis is to statically identify malware that is highly evasive. Such evasive malware may use either dynamic analysis evasions, such as querying the execution environment, or static analysis evasions, such as heavy obfuscation. An example of such malware is shown in FIG. 9. This sample is based on real malware, using custom packing logic to dynamically generate code, which we detected with our technique but evaded analysis by straightforward dynamic analysis. After unpacking, the generated code performs a variety of evasive checks to attempt to avoid automated analysis. We speculate that checking cookies and the referrer are attempts to evade automated analysis that usually does not revisit sites, or click links to navigate. Checking the browser and operating system of the user, and the TLD of the server may be further attempts to evade analysis, but may also be to be more stealthy and target specific victims.

The specific checks here are only an illustrative example of the types of evasions that malware can make. In general, it is not possible to sufficiently enumerate and test all of the different permutations of execution environment that malware may require to activate. Beyond just the execution environment, malware may also only activate for specific user-input, as is the case for credit-card skimmers and other credential theft, which, for example, may expect a properly formatted credit card number or email address. Worse, in the case of web applications, each time the web page is loaded, the browser interacts with the compromised or malicious external server, potentially alerting the malicious actor to analysis and risking becoming blocked by server-side evasions. This type of evasive malware is the type of malware that we target with our analysis: the abstract interpreter as disclosed herein with respect to various embodiments is designed to be able to concretely execute the unpacking code, but then be able to explore multiple execution paths abstractly to activate the malicious payload.

B. Abstract Values and Operations

To create our abstract interpreter, we define the values and operations that we will execute over. We want our analysis to be able to execute concrete code precisely, as in FIG. 9 (a), but also abstract to multiple execution paths, as in FIG. 9 (b). Here we describe the types of values and constraints on those values that our analysis supports, and the operations that manipulate those values. A list of the values that we support and examples are shown in Table II of FIG. 10.

Concrete values: A significant part of our implementation is in support of concrete execution. Concrete execution allows our analysis to deobfuscate code custom unpacking code, such as in FIG. 9 (a). For concrete values in our implementation, we use concrete values in our embedding Node.js JavaScript execution environment. Our concrete execution engine attempts to exactly emulate operations in a standard JavaScript interpreter. In addition to primitive values, like strings and numbers, we also leverage some concrete heap objects from the Node.js environment, like the JSON or Math JavaScript objects.

Option values: We model option values by keeping a list the different options that a value could be. Option values are commonly created when our abstract analysis joins the results of different code paths, but may also be created during certain operations like the tertiary operator. We will discuss the joining process more in Section 3-D. To execute operations on option types, we execute the operation multiple times with each different option. For example, {1 or 2}+1={2 or 3}. In practice, combining option types repeatedly can cause state explosion [51]. For example, in the operation {1 or 2}+{1 or 3}={2 or 3 or 4 or 5}, we can see an increase in the number of states that our analysis stores. In our implementation, we limit option types to a hard number of different options—in our case two (e.g., or another limit value can be similarly utilized to perform the disclosed techniques). When the program goes beyond this limit, we convert the option value to an unknown value. This allows our execution to continue, but sacrifices precision in our analysis. We experimented with allowing more than two options, but found that it did not give more detection yield and even decreased yield in some cases where additional time was spent evaluating spurious execution paths.

Typed values: We model typed values by marking that a value is unknown except for whatever typing information we have about that object. An example of this is the operation unknown value+"astring"=string type, because the JavaScript language ensures that using the plus operator when one of the operands is a string results in a string.

Sometimes, we may not even know the type information, in which case, the value is completely unknown. Such values are useful to abstract over multiple scenarios of the execution environment. For example, in FIG. 9 (b), line 13, our analysis should understand that the navigator.appVersion is a string, but we do not know exactly what string. Therefore, we do not know at analysis time, which if branch is taken, and analyze both branches.

Prefix string values: We model prefix strings by storing the prefix value of a string. We chose to specially model such constraints on values to be able to detect that a malicious request will occur and we do not know exactly the URL that will be requested, but we do know the host and potentially partial path information. Specifically, we may see code like window.location='malicious.com/path?param='+unknown value. When our analysis encounters this code, the analysis knows "malicious.com/path" is being visited even if it cannot determine the exact query parameter value used. Similar logic holds for when we encounter HTML markup generated by JavaScript. We choose not to model suffix strings due to the limited value that it would bring.

Heap values: So far, we have described modeling of stateless values, e.g., numbers and strings. For such values, our analysis does not store anything beyond some extra bookkeeping data. However, heap objects, like arrays and Objects (e.g., "test": "string"), are mutable. Because these objects store state, we have to specially handle them in our memory model to be able to separate changes due to executing multiple program branches. In our implementation, heap objects are stored as an index in our abstract heap memory, which contains properties and values. This allows us to keep track of object state in the same way that we handle other program state, such as variable state.

JavaScript defined functions: We model JavaScript-defined functions as a triple of: a pointer to an abstract syntax tree node defining the function's entry point, an abstract heap object that points to the function's prototype object, and an abstract heap object that points to the function object itself. We separate the prototype object and the function object itself to match the JavaScript language standard.

Natively embedded functions: Finally, we also model a small number of native embedding functions, which are coded by hand for our interpreter. Normally, these are functions that are implemented by the V8 or Webkit embedding environments, such as eval, Function, setTimeout, document.write. However, because of the changes required by our execution method, we implement custom versions—we do not want to use native eval; instead, we want to execute our code using our special evaluation method. We create custom implementations for, for example, 46 primitives functions (e.g., at the time of writing). For example, in FIG. 9 (a), the call to document.write is specially crafted to recursively analyze the unpacked JavaScript code.

C. Abstract Memory Model

In a concrete interpreter, the interpreter only stores the current program state. However, in our abstract interpreter, we store all program state across different branches of execution (e.g., as shown at 408 of FIG. 4). Our memory model is designed to be able to efficiently keep track of program state at different points. In order to do this, our memory model is built on the idea of immutable mappings of variable slots to abstract values.

Each mapping additionally, has a preceding mapping that represents all previous chronological program states—this is based on an implementation of compiler dataflow analyses aiming to reduce memory usage [52]. When we want to look up a slot in memory, we search for the slot in the current program state. If the current state does not contain a binding, then we recursively search all previous states. This design allows us to easily branch program state by creating two successor states with a common ancestor. When we want to join two program states, we first find the most recent common ancestor state and then merge all the bindings that have occurred since branching. In some cases, we found that the performance of this recursive lookup can be quite slow when there is a large number of ancestor states. Therefore, we cache lookups to the same slot that recurse more than a set limit.

C. Abstract Control Flow

In Section 3-B, we described how we model and evaluate simple expressions on abstract values. In this section, we describe how we manage control flow with abstract values. In concrete execution, when the interpreter encounters a branch, like an if statement, the interpreter evaluates a test and then chooses either the true or the false branch. In abstract interpretation, we may execute the true branch, the false branch or both branches, depending on the result of the test.

The stopping criteria for control flow is when all code has been executed and all paths have been explored. This allows our engine to deobfuscate code that uses multiple layers of obfuscation. In practice, analysis may be stopped earlier at a set timeout, for example, after ten seconds.

In Section 2-A, we described the general technique of abstract interpretation. Here we focus on how we tailored this abstract interpretation to our specific problem. First, we build control flow graphs of JavaScript code from JavaScript abstract syntax trees. Then we describe how we interpret instructions using the control flow graph to guide our execution.

a) Control flow graphs: To build a control flow graph from JavaScript, we take as input an abstract syntax tree. We create control flow graphs at the function level. We consider the top-level execution context as a special function that takes no arguments. Our analysis caches control flow graphs for each function, so that a function only has its control flow graph generated once per analysis session.

b) Interpretation loop: Our control flow engine loop operates similar to classic dataflow analyses, found in general purpose JavaScript compilers [52]. During analysis of a function, our dataflow loop maintains a working set of AST nodes that remain to be analyzed. When modeling execution of a function, our analysis starts at the function's entry point and iteratively adds subsequent nodes. When it reaches an unknown branch point, it adds both sides of the branch to the working set. Here we focus on some of the practical improvements to our specific problem.

In a standard dataflow algorithm, the analysis may join state at all join points, including loop back-jumps, which means sacrificing precision for soundness of results. However, since for our use case of deobfuscating code, we highly value precision and are able to sacrifice more execution time. Instead, we chose to aggressively unroll loops when the analysis engine can precisely determine the loop condition value. This allows our analysis to iterate and execute custom unpacking loops that are common in obfuscated code [8], [11]. When our analysis cannot determine concrete control flow, we fall back to standard dataflow analysis.

In general, when our analysis is certain that it can predict the exact control flow within of a function, we optimistically use fully concrete execution for that specific function and then return to abstract interpretation after the function finishes. This optimization allows us to remove much of the memory overhead from our dataflow analysis in such cases.

When we use concrete execution, the analysis engine does not need to store all separate program state at all times, as described in Section 3-C. It also allows us to relax our memory model because we know that there is only one possible program state. This allows us to avoid creating large numbers of small objects, reducing run time and memory usage.

c) Abstract function calls: When our analysis encounters a function call, if our abstract interpreter can determine the function value, then we jump to the function's body and begin a new dataflow analysis loop with a modified program state simulating a new stack frame. If the function call value cannot be concretized, then the analysis will skip the function call. This type of error is one example of how imprecise execution may result in false negatives for our deobfuscation. When the function call finishes, we copy escaping state into the callee's state. For example, heap objects or variables closures may escape scope, but not function local variables. In some cases for recursive functions, our analysis may not be able to precisely determine control flow of the base case, and may infinitely recurse. In these cases, we place a finite limit on recursion (e.g., an example limit for such recursion can be set at 30). When that limit is exceeded, we continue execution and return an unknown value.

E. Example Implementation

Here we describe more details about our implementation of JavaScript. We spent many man-hours on implementing the little details of modeling the JavaScript language. Many programs, and malware samples especially, rely on small details in the JavaScript specification and embedding APIs. In addition to the JavaScript language, JavaScript primitive functions-such as strings, regular expressions, and arrays—and the document object model (DOM) APIs and other embedding APIs provide a huge amount of functionality that can be modeled for a high fidelity environment for malware. Our implementation contains more than 100 test cases including different types of obfuscation and simulated malware samples based on samples found in the wild.

a) JavaScript native environment: To make implementing a JavaScript environment tractable, we chose to implement our analysis in JavaScript. This enables us to leverage our analysis environment's concrete execution by directly using functions defined on primitive objects. So, for example, we do not need to implement the logic for the String.prototype.match function, because we use the Node.js execution environment to implement it for us. At the same time, we intentionally chose not to implement our analysis on top of an existing JavaScript interpreter, as done in prior work [49], in order to have more control over execution and to be able to package analysis for low-latency deployments.

We chose not to implement our analysis inside of the web browser-though our JavaScript implementation can be transparently ported into a web browser-because we wanted to have more control over the browser engine. We did not want our execution environment to contact malicious servers or be able to manipulate server-side application state. Furthermore, we wanted to be able to analyze standalone scripts without HTML or a complete web page, in which some external JavaScript objects may not be defined.

We also use a list of all the DOM APIs that are defined in the web browser and define a default implementation that returns an unknown object for all functions and variables [52]. Finally, we include implementations of libraries that are commonly used by malware, for example, jQuery and AES decryption functions, in our analysis as built in functions. These are all preprocessed ahead of analysis time in a bootstrapping phase to reduce our startup time.

Because we are technically executing arbitrary, potentially malicious code, we protect our host environment inside of a V8 isolate sandbox. In theory, our abstract execution engine sandbox would intercept calls to dangerous functions, like eval. However, in practice, the history of low level sandbox escape exploits led us to pursue further isolation. We use the isolated-vm library [53], which enforces that our analysis code cannot access Node.js sensitive APIs by using V8 Isolates. This isolation primitive also enforces resource limits on memory and CPU time so that malicious code or inefficient analysis cannot overload the host's resources. When analyzing malware, we additionally add another layer of isolation at the OS level, running inside a Docker container.

b) Speculative in-memory decoding: Controlling the JavaScript engine also allows us to have deep insight into the program's execution as it happens. In order to detect other indicators of malicious patterns, we also use during execution information by speculatively decoding portions of in-memory strings. We attempt to parse all in-memory strings as URLs or HTML and use this information to render a detection verdict. We also speculatively decode strings before parsing by detecting base64 encoding, HTML encoding, and escape encoding. Speculatively parsing all of our in-memory strings was taking the majority of our execution time in early versions of our implementation. In order to improve our implementation's performance, we optimized for the common case when strings are not meaningful; we first filter out irrelevant strings with approximate, but over accepting, regular expressions that operate on a short prefix of the target.

c) Error tolerance: We built our analysis to be tolerant of some specific classes of errors that occur when analyzing standalone scripts—most commonly undefined variables or functions, but also some typing errors. A normal interpreter would throw an error for such exceptions, but our interpreter instead only throws an error when it detects that the code is inside a try-catch statement. Instead, undeclared variables or functions calls return an unknown value. We found this to be a useful heuristic when analyzing malware that intentionally uses try-catch statements to either cloak their analysis, or probe their execution environment, for example, looking for environment-specific objects, like ActiveXObject. This allows our analysis to gracefully handle inline analysis on the network in which only a portion of the website's JavaScript code is visible, while still identifying malware that uses exception cloaking to avoid detection inside of virtual analysis.

d) Forced execution: Because we control the execution environment, we can additionally cheaply force execution of unexecuted functions, for example, event handlers. This is similar to forced execution that occurs in engines that are baked into the JavaScript interpreter [26], [28], but with the benefits that our analysis does not split execution when encountering a branch, but instead completes execution in a single pass, improving performance. Furthermore, our analysis does not connect to external servers, and it does not go down spurious paths within functions, reducing false positives for unreachable paths. Forced symbolic execution allows our analysis to identify malware that only activates in response to specific input, such as the user entering a valid email or credit card number in a specific text field.

Because our analysis is built outside of a web browser, our analysis does not connect to external servers, due to our analysis execution sandbox. This property means that we will not modify external, server-side program state. A common problem with in-browser JavaScript forced execution is that such server-side modification can, for example, unsubscribe users from websites without their knowledge when analyzing links from emails or do other harm to users on benign websites. Such forced execution can also prevent common, onetime malware pages—pages that, once visited, the malicious server prevents from being used—from being analyzed further, and can alert malware authors of analysis.

4. Application: Link Extraction Detection

Our deobfuscation analysis is helpful in revealing code that is executed and what functionality is exercised on the web page, but, by itself does not include detection logic. Instead, we view our analysis as a virtual platform, on which to build further analysis.

One analysis application we explore here is to extract the URLs that a piece of JavaScript will connect to and use this knowledge to detect malware samples. For example, we may detect: JavaScript that adds a script node with a src attribute, dropping a new remote script; adding an img with a src attribute; XMLHttpRequests; Embedded DOM in document.write that writes a form with an action; etc. To illustrate, in FIG. 9, our analysis first deobfuscates the unpacking code in FIG. 9(a), then detects the page is redirected by assigning to the window.location object. Malicious link droppers such as this are somewhat common for malicious code, though it is only one specific malware behavior among the large number of behaviors malware may exhibit. Examples of other applications include, for example, using the deobfuscation output to preprocess malware samples before applying static methods, like machine learning models or static signatures.

When we extract URLs from a JavaScript sample, we then check those URLs against a variety of external knowledge bases that indicate whether those URLs are malicious or not. We describe the results that our improvements to our detection methodology caused by our deobfuscation engine in Section 7-B.

5. Adversarial Threat Model

As described herein, we focus on identifying malware that other approaches cannot identify while generating no false positives, as this is the key target of automated malware analysis in an industrial context. Any new method may have a variety of false negatives. Indeed, current static or dynamic analysis methods all have false negatives, especially when considering adversaries with deep knowledge of the detection method. Therefore, our evaluation criteria for our new detection techniques is the number of new detections that other methods do not find while at the same time generating no false positives.

Because our target goal is analyzing potentially malicious programs, we consider how resilient our analysis is to evading detection inside our evaluation sandbox. The main goal of this work is to analyze programs that are so evasive that they are not detectable with current straightforward dynamic or static analysis. Our aim is not to replace other analysis, but to supplement existing static and dynamic analysis techniques. Therefore, we report numbers that show the increase in detection in a production environment over other methods in Section 7-B.

a) Adversarial evasions: It is indeed possible for an adversary to prevent analysis by our system, for example, by exploiting path explosion causing our analysis to lose precision. Despite the theoretical ability for attackers to evade our analysis (just as attackers have the ability to evade current dynamic and static approaches), we present a new method of analyzing JavaScript that uses anti-cloaking and anti-obfuscation techniques. Our approach is not meant to remove the need for more complete dynamic approaches with higher sandbox fidelity, but to supplement it in a practical way. As we show in Sections 7-A and 7-B, our deobfuscation engine can deobfuscate the vast majority of real-world malware samples and can increase detection over existing methods.

In the context of stand-alone evaluation at the network, our analysis may have false negatives due to not having access to DOM information when JavaScript code is delivered separately from HTML code. This could allow attackers to evade analysis by hiding code in the unavailable HTML code (e.g., by using eval on text hidden inside HTML). Fundamentally our tool does model DOM APIs, so this evasion technique does not work when complete information is provided to the tool, but in some contexts complete information is not possible. Even in these contexts, we show that such evasions are rare in practice. Finally, our deobfuscation engine does not implement every possible JavaScript API, as it is not practical to implement the thousands of potential API calls embedded in the native environment. We focused on the APIs that are most commonly used by malware.

Resource overloading evasions are another example of an evasion technique that may cause false negatives in our analysis. In this technique, a malware author crafts input, so that our analysis consumes too many resources (e.g., CPU or memory) to render a positive verdict. These techniques also apply to classical dynamic or static analysis. Although in our case, attackers may trigger analysis state explosion.

Anecdotally, we observed that for many of these evasions, even though our deobfuscator code may not successfully deobfuscate the code, the evasions themselves make the code more detectable by other analysis methods. For example, evaluating code that is hidden in an attribute on the DOM is itself suspicious, and is detectable. Increasing page bloat to the point that analysis is difficult also becomes more noticeable to users and automated methods. Even considering such limitations the vast majority of malware does not use such evasions at this time, as we demonstrate in Section 7-A.

b) Malicious link dropper detection: For our application of malicious link dropper detection, a limitation of the detection logic is that it relies on an external knowledge base of previously known malicious URLs. Construction of such a knowledge base is not the focus of this discussion, and we acknowledge that it may itself have false positives or false negatives, and relies on leveraging previous knowledge to generate new detections. Our aim is only to demonstrate one possible application of the deobfuscation engine to malware detection and not to claim that this particular detection method is either sound or complete. Nonetheless, malicious link droppers are common in practice, as we show in Section 7-B. They are also prone to using techniques that evade other analysis, because they present an easy entry point for malware to suppress malicious behavior when analyzed in a detection environment.

6. Methodology

We describe our data collection process for labeled benign and malicious samples below for the purposes of assessing accuracy of our deobfuscation engine. We additionally collect unlabeled URLs from end-user traffic, provided to us by a cyber-security company.

a) Benign labeled JavaScript: We collected benign JavaScript samples from popular websites. This is based on the assumption that popular websites tend to have less malicious content. In particular we used the top one million domains from Tranco list, which aggregates and cleans several popular top lists. The Tranco list has been shown to be more accurate and legitimate than other top popularity lists [54]. In addition to Tranco's filtering, we ignored samples flagged by manually crafted signatures and other detection methods by state-of-the-art URL filtering services followed by manually analysis to confirm malicious content. Such malicious cases are not surprising, as it is common for malicious sites to attempt to increase their spread by manipulating top website lists [54].

The crawling was performed in the Spring of 2020, with more than 10 million unique scripts collected. We report on our benign traffic in Section 7-A to measure latency on benign traffic, and Section 7-B to report on the false positive rate.

b) Malicious labeled JavaScript: We leverage VirusTotal [55] as our main source of known malicious JS samples. However, VirusTotal's malicious file feed contains mostly HTML files but not JavaScript directly. To accurately pinpoint the malicious part inside a malicious HTML file, we extracted inline snippets and externally referenced scripts from Virus-Total's feed of malicious HTML files, and resubmitted them to be confirmed by VirusTotal again. As a malicious threshold criterion, we used at least three Virus-Total vendor hits, because we found that a minimum of three hits were required to be reliable. The data collection started in 2014 and our system collected more than 200,000 unique malicious samples at the time of this writing. Based on the number of unique tags provided by VirusTotal Vendors, those represent more than 100,000 malware names. The most popular tokens among tags were ExpKit, Trojan, Virus, JS.Agent, HTML/Phishing and more. To complement the externally acquired data set, we added approximately 10,000 of malicious exploit kits detected by signatures in traffic from the cyber-security company. We additionally subdivided our dataset into two groups to understand current chronological trends: a pre and early 2020 group, which that extending from the beginning of 2020 until April 2020; and a late 2020 dataset, extending from May to August 2020.

c) Unlabeled traffic: Our VirusTotal data is labeled, but it may have some sources of bias, which we discuss in Section 8-A3. To counter that bias, and triangulate findings across orthogonal datasets, we additionally test our system on real user traffic in-the-wild. However, because it is real traffic, it is not labeled. We ran our deobfuscation system on this traffic, and report on the samples that our malicious link detection system detects in Section 7-B. The URL feed from this source includes: a subset of end user traffic from web browsing, and URLs embedded inside emails and files (e.g., PDFs, executable binaries, etc.); newly registered domains, hostnames, and certificate registrations; popular websites; and URLs from the VirusTotal feed.

7. Results

We described our abstract analysis engine in Section 3. Here we report results for deobfuscating labeled data in Section 7-A, and results for detecting unlabeled data in Section 7-B.

A. Deobfuscation Results

Figure 11:
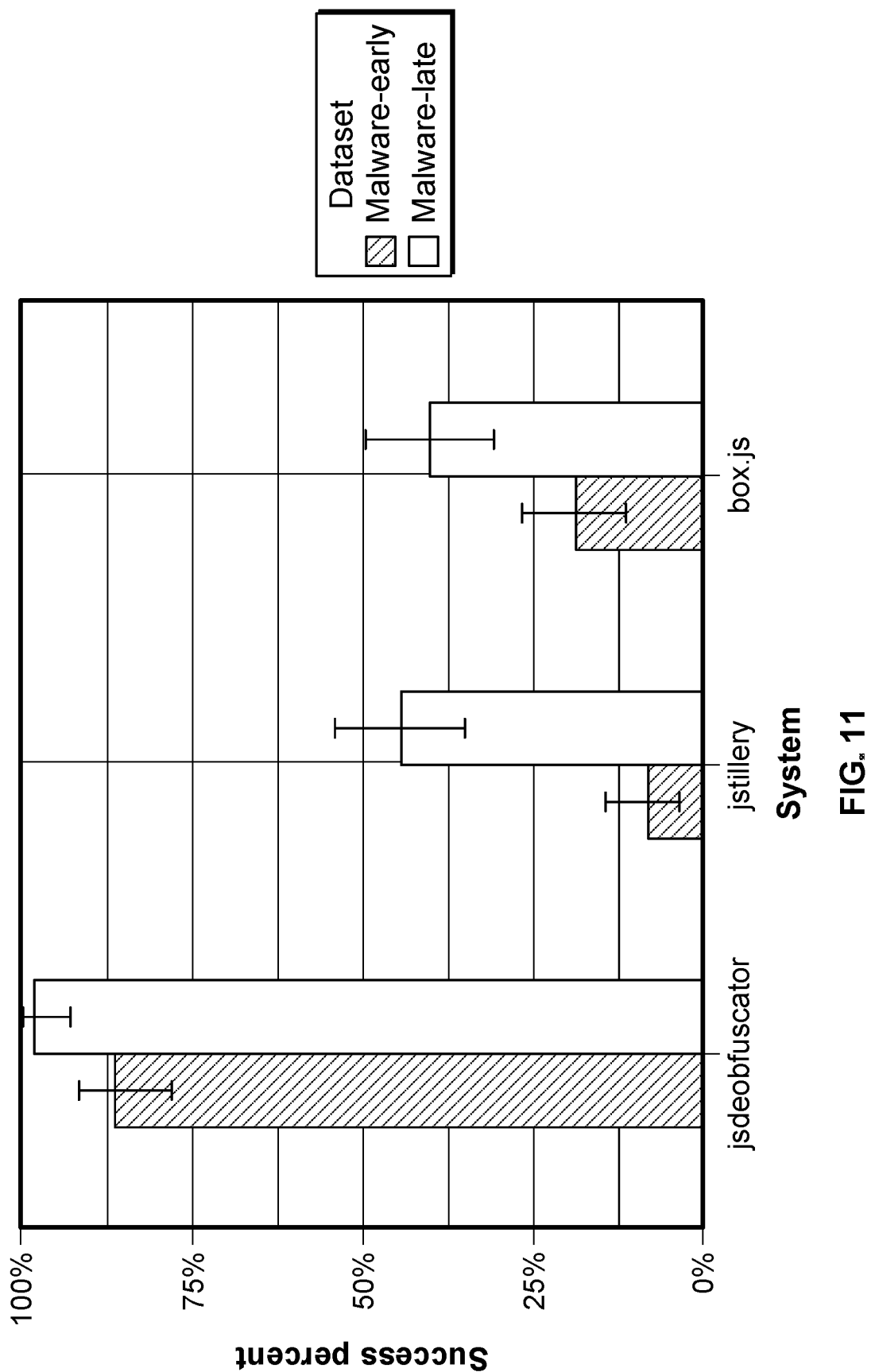
FIG. 11 is a chart of the success rate of different systems deobfuscating JavaScript.

Here, we describe the success rate of our deobfuscation engine. We present results from our two datasets collected from VirusTotal [55], described in Section 6. We find that our deobfuscation engine is able to deobfuscate 86% of malware in our pre and early 2020 dataset and 98% of our late 2020 dataset. Because, evaluating success in deobfuscation is not possible with automated means, these numbers are collected by manually analyzing a random sample of our 200,000 malware samples from our collected labeled dataset. We also compare the results of our tool against a popular open-source, security focused deobfuscation program: JStillery and Box.js [30]. We found that JStillery was able to deobfuscate 8% of our early dataset and 44% from late dataset. JStillery often failed to handle complex custom unpackers and subtle DOM interactions. Box.js was able to deobfuscate 18% of our early dataset and 40% of our late dataset. Box.js often failed to deobfuscate samples with DOM and Webkit functions. Our results are summarized in FIG. 11 and Table III of FIG. 12. Referring to FIG. 11, the success rate of different systems at deobfuscating JavaScript. The y-axis shows the success percentage. The x-axis shows the different systems: our system, jsdeobfuscator; jstillery; and box.js. We show results on our pre and early 2020 dataset and our late 2020 dataset. Error bars show a two-sided 95% confidence interval for measuring proportions.

Sometimes, samples did not parse correctly most often due to data that was incorrectly classified as JavaScript, but was not JavaScript (e.g., commonly HTML or VBScript). We did not include these samples in our analysis, which gives a total of 93 JavaScript instances in our early 2020 dataset and 98 instances in our late 2020 dataset. For much of our discussion, we present results together.

Generally, it is not feasible to automatically determine whether a piece of code has been fully deobfuscated in a precise way-code may have multiple layers of obfuscation, or none at all, and the program's output may or may not be correct. Because of the difficulty determining success or failure, we manually inspect the output of our tool on a randomly sampled subset of our data to have confidence that deobfuscation succeeds. We randomly sampled 100 malware programs from our dataset, remove non-JavaScript samples, and manually reverse engineer the malicious code and report our results on these samples. These correspond to a one-sided 95% confidence interval of greater than 78% (p=80, n=93) and 93% (p=96, n=98) of malware in our samples respectively that are able to be deobfuscated [56], [57]. Additionally, we could not evaluate the tools by, for example, the presence of malicious URLs in the output because not all malware samples include malicious URLs, and not all tools contain URL output.

Successful deobfuscation criteria: Our general criteria for successful deobfuscation is that the tool will provide more information about execution than the input source code. For example, when a code generation primitive is used the source code that is generated by the tool under test should be visible for as many layers of obfuscation that are used. For example, the following behaviors were counted as failures: errors while analyzing code, not responding within a 10 second time window, output that does not match the original, and output that was substantially similar (e.g., only changing white space).

Code generation obfuscation cases cover the majority of our datasets, at 86% and 69% in our two datasets, and are unambiguously labeled-if a code generation primitive (e.g., eval) is present, then the deobfuscation tool predicts the code that is executed for as many layers as are present, otherwise deobfuscation is not considered successful. Because the vast majority of samples fit under this category, or other similarly straightforward to label categories, and are not ambiguous to label, we believe our criteria to be reliable. When a code-generation primitive is not used the tool should provide more clarity in the specific malicious behavior. For example, when a sample redirects a web page to an encoded URL (e.g., using hex encoding "\x62\x61\x64\x2e\x63\x6f\x6d" is "bad.com" or with String.fromCharCode) without code generation, the tool should be able to decode the URL. For our own analysis, this is straightforward and consistent to evaluate-either it produces output of the malicious behavior or not; however, for other tools that have different output formats, we rated as success cases when those tools provide more information about execution than the input. In the small number of remaining ambiguous cases, we were consistent among the three systems. We believe the numbers presented here are an upper bound for rating jstillery and box.js and a strict bound for the jsdeobfuscator system presented herein.

a) Reasons for unsuccessful deobfuscation: There were a handful of tactics that prevented us from successfully deobfuscating code. Because our analysis only failed to deobfuscate 15 samples of our dataset, we cannot quantify frequencies precisely, but it is clear that the largest blocker is interaction between the DOM and JavaScript. The majority of cases (e.g., 9 of 15) where our analysis fails are due to such interactions between the DOM and JavaScript code. Fundamentally, our infrastructure is capable of modeling DOM interaction and we believe could catch these cases; however, these specific samples did not have DOM information attached, and we wanted to have a fair comparison with other tools which also do not have access to DOM information. We believe that four of these nine were part of the same malware family because of strong similarities in their code. Next most common, we observed three cases of imprecise modeling of the execution environment. We also observed singleton cases of a bug in our JavaScript parsing library, complex control flow causing state explosion, external dependencies on unincluded code. Based on this evaluation, we believe that interaction between DOM and JavaScript to be the most fundamental limitation of our current implementation, and we discuss future work and mitigation more in Section 8-A2.

b) Deobfuscation latency: We measured the time to analyze both benign and malicious scripts. We found that our tool can return results for malware in our early dataset for 58% of samples in less than 100 ms and 96% of samples within 10 seconds. Our results are better for our later dataset with 81% of samples in less than 100 ms and 99% of samples in less than 10 seconds. For benign code, we are able to return a result for 75% of benign samples within 100 ms and for 90% of code within 10 seconds. Our results are summarized in FIG. 13 as described below. For this analysis, we used a 30 second timeout. Our average time to analyze malware is 855 ms with a 10 second timeout and 1.6 s with a 30 second timeout. For benign data, our average time to analyze is: 36 ms with a 100 ms timeout, 1.2 s with a 10 second timeout, and 3.0 s with a 30 second timeout. We randomly sampled 1,000 instances of malware from the malicious data from our labeled VirusTotal dataset, and 1,000 samples from our benign production traffic to take these measurements about our analysis latency. Typically, when execution takes longer than our timeout, it is due to imprecisely predicting loop finish conditions.

Figure 13:
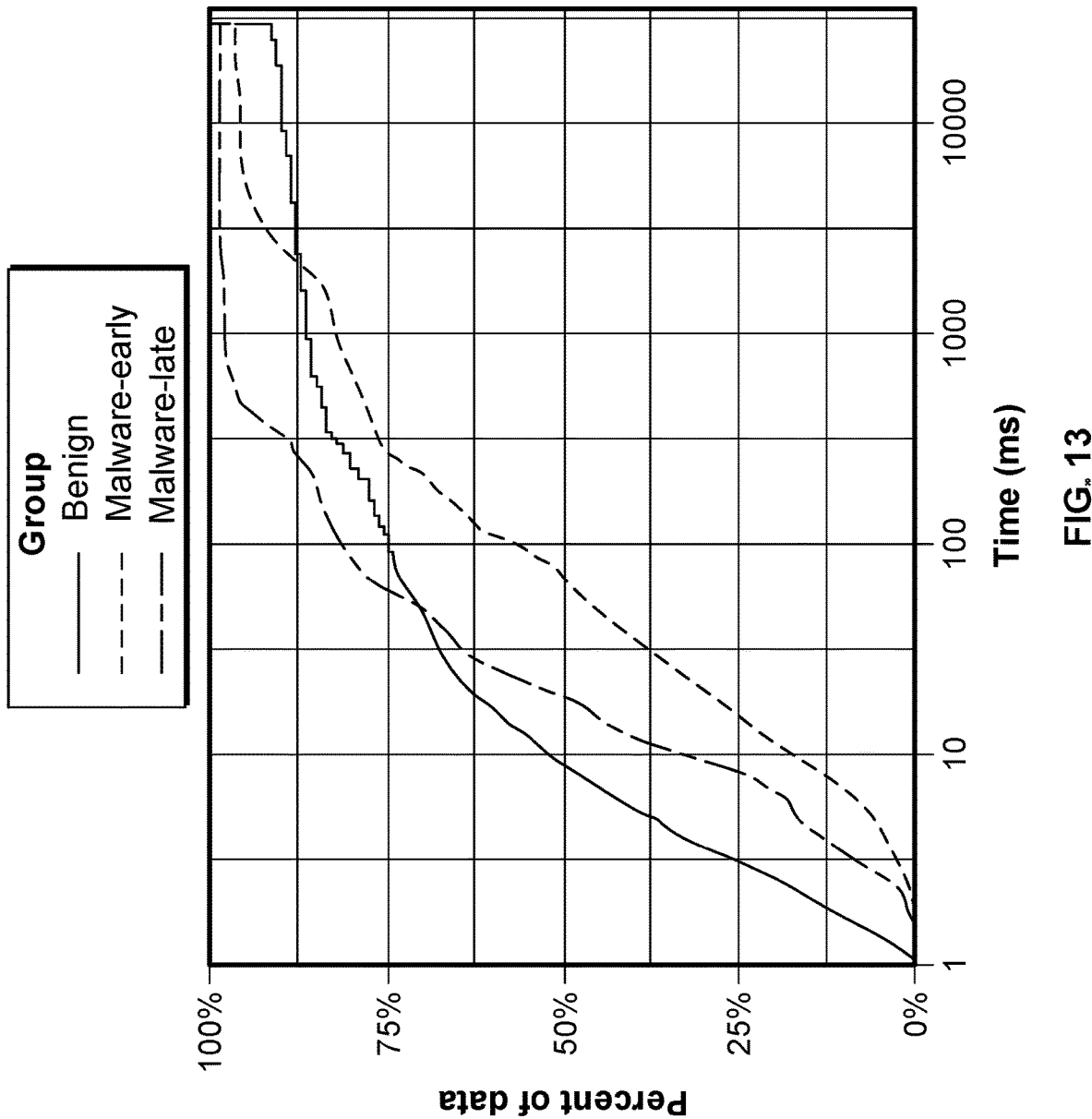
FIG. 13 is a graph of the cumulative distribution of time to analyze samples broken down by the type of sample.

FIG. 13 is a graph of the cumulative distribution of time to analyze samples broken down by the type of sample. We show data from our benign dataset and our two malicious datasets from pre and early 2020 and from late 2020. The y-axis shows the percent of data that can be affirmatively analyzed below a specific time on the x-axis. The x-axis shows time in ms in log scale. For example, 58% of malicious JavaScript samples from our early dataset can be analyzed within 100 ms.

Our experiments were conducted in a single thread with a resource limit of 2 GB of memory—code running in the virtual machine that attempted to allocate more memory than this limit were stopped. This memory limit is primarily for safety of the host system, and not for performance; no samples in our dataset actually reached this limit, though we have encountered in-the-wild samples that do. With most code executing well below this limit and with low analysis time, we believe our execution environment to have reasonable resource usage for the average case.

c) Off the shelf obfuscation methods: We tested our analysis against a list of off the shelf obfuscation tools with a small sample script [13]-[19]. We succeeded in deobfuscating all of our test payloads. While defeating these specific obfuscation engines was important, it is more significant that our technique was broad enough to be able to emulate sufficient functionality across these different obfuscation engines. For example, some of the engines create packing code similar to that in FIG. 9 (a).

B. Detecting Malicious Links

We measured the detections from our deobfuscation engine's link extraction, described in Section 4. We measured results on a subset of URLs extracted from the logs of end-user traffic from a network security company.

a) True positives: We found that our deobfuscation engine detects on average 7.5K extra URLs each day, measured over a seven day period. These are jobs that were not detected by our existing dynamic and static analysis methods. The increase represents an increase of roughly 15% compared to one of the detection systems used in a security company in an industry setting. An average of 7.1K URLs per day overlap with existing verdicts.

We randomly sampled 50 instances of novel, previously undetected, detections to understand what types of malware were being covered. We found the types of detections that were previously undetected include, for example, the following: card skimmers and other credential theft pages, which require specific user-input (78%); pages in which malicious code encountered a transient error that was allowed by the more error-tolerant deobfuscator (14%); pages exhibiting evasive cloaking (6%); and one page using time-based cloaking that only activates after a specific period of time passed (2%).

b) False negatives: Because of the volume of traffic and lack of labeled data in an in-the-wild environment, we often cannot determine how much malware remains (i.e., false negatives). Furthermore, we consider this as one analysis among many methods, each with their own blind spots, and therefore, we do not focus on false negatives. However, we have anecdotal evidence that when we do have false negatives, a common reason for false negatives is that the deobfuscation engine successfully deobfuscates code, but that the external knowledge bases fail to detect the malicious URL.

c) False positives: Our target goal for detection is to have no false positives when we render a malicious verdict. After many iterations of assessing quality of verdicts and pruning problematic detections, we have not confirmed systematic false positives in our deobfuscation implementation. In our benign ground truth dataset, we have observed no false positives.

However, we have observed some anecdotal false positives in our external knowledge bases outside of our ground truth dataset. In addition, during development, we filtered some results from our speculative execution of in-memory that were prone to false positives. Specifically, sometimes we observed code that contained malicious URLs in memory, but for benign purposes. Common examples of benign cases include the following: advertising libraries that use a list of malicious domains to check loaded content for safety; code that checks for common typos when entering email address. We maintain a list of common code patterns and domains that indicate such benign cases and filter those cases out, unless we discover affirmative evidence that the URL would be contacted during page execution—for example, if a script is created with a src set equal to our target URL. We manually sampled 50 domains of our malicious verdicts and did not discover any false positive verdicts. We additionally compared our detections to a list of potential false positives, randomly sampled 50 from this list and did not find any false positives.

d) Existing dynamic and static analysis: While the existing infrastructure and detection logic of the security company against which we measure improvement is not the primary focus in this section, we describe it briefly here to give context to the results of our deobfuscation engine, and to illustrate the improvement that our engine provides versus different existing static and dynamic approaches. The infrastructure crawls URLs provided to our system in a modified web browser. While visiting the page, it extracts JavaScript and HTML content on the page in addition to the auxiliary requests made on the page. Other detection modules run on the content that is scraped from the web page (e.g., URL content from feed as shown at 402 and 404 of FIG. 4) and the behavior that is exhibited by the page. Existing detection capabilities include signature-based logic, a machine learning model operating on static data, logic to query the dynamic requests made on the page against external knowledge bases, and other custom detection logic. The deobfuscation engine presented herein with respect to various embodiments (e.g., deobfuscation engine 400 as shown in FIG. 4) executes on the content that is extracted while visiting the website.

8. Discussion

Here we interpret our results for deobfuscating and detecting malware from Section 7. First, we give context to our deobfuscation accuracy and time performance in Section 8-A. Then, we address limitations of our results in Section 8-A3.

A. Deobfuscation Results

Our goal was to build a deobfuscation engine that could deobfuscate standalone JavaScript code outside of a web browser. We showed that our deobfuscation engine was able to deobfuscate the vast majority of malware-we measure between 86% and 98% of malware depending on our dataset. We were surprised by how successful our technique turned out to be. Originally, we had believed that JavaScript was too dynamic to statically deobfuscate, but interestingly found that for many cases, our tool is able to deobfuscate samples. Indeed, in our results for our in-the-wild environment, we find that our analysis improves our overall detection capabilities by detecting new and unique malware, increasing our detection capabilities by 15%. Our deobfuscation accuracy suggests that, in practice, the problem of state-explosion is not a serious limitation for the vast majority of cases of malware.

When we compared with other security-focused deobfuscation implementations, we found that in our malware sample they were able to deobfuscate only 8%-42% for JStillery and 18%-40% for Box.js—this shows a clear increase in deobfuscation performance using our disclosed techniques. Furthermore, when comparing with our existing analysis in our production environment, we find that our analysis finds many new malware cases—commonly cases in which specific user input is required or there is client-side cloaking.

1) Analysis performance: We put significant effort into making our implementation meet our performance goals—the optimizations we describe in this work, were the result of profiling and identifying code hotspots: pessimistic early quit when our analysis cannot make precise progress, optimistically modeling a single path of control flow, optimizing speculative decoding performance for the common negative case, caching program state lookups, caching control flow graph creation, and ahead of time bootstrapping.

When we measured our analysis latency, we had two different use cases in mind. First, we wanted to be able to scale our analysis up to our production workloads for offline analysis, described in Section 7-B. For this use case, we can be more tolerant of large latency for specific samples, but would prefer our average analysis time to be low. We achieve an average time per sample of less than one second, which we found to be highly scalable. Because total analysis time in practice is dominated by benign code, increasing our timeout from 10 seconds to 30 seconds increases our overhead by 2.5× with minimal malware gain. We decided to use a 10 second timeout for our analysis.

For our second use case, we target inline analysis on a network-connected firewall. Inline analysis has many important benefits, allowing analysis of web pages that are behind logins or malware pages that use server-side logical cloaking. To target inline defenses, our analysis should be responsive enough so that the network can still respond quickly and efficiently for users. For this use our 100 ms response window target can be acceptable, especially when we consider that we can give a 10 ms response time for 52% of benign traffic, which dominates the input volume. At this performance target, we find that we can still deobfuscate between 58%-81% of malware samples depending on our dataset. Typical latency can be further reduced when we consider that we do not analyze all traffic, but only new traffic—there's no need to analyze the same jQuery library many times over; most popular traffic will give a quick, cached response.

2) Comparison to other analysis: At a high level, we find that our analysis can act as a low-latency deobfuscation engine. Furthermore, we find that our analysis can identify highly evasive and obfuscated malware, some of the most difficult cases of malware to analyze. Our deobfuscation engine can integrate well with other static analysis techniques, allowing machine learning models or signatures to be deployed on deobfuscated code. One specific analysis for detecting malicious external connections demonstrates that our analysis can improve detection by 15% against other static and dynamic analyses (Section 7-B). Furthermore, because our analysis is outside of the web browser, we can deploy our analysis for inline defenses on the network to analyze scripts in isolation. One limitation of our dataset is that we do not have full access to the web page content DOM and additional browser infrastructure. Fundamentally, our tool does simulate DOM interaction, but our dataset did not contain HTML data. Indeed, we found that when we failed to deobfuscate code, this was the most common problem, accounting for 60% of evasions.

A smaller concern, based on our data, is imprecise modeling of the execution environment, accounting for 20% of other evasions. Detection misses are targets for future improvement, but nonetheless, they account for a very small percentage of samples, and overall, the vast majority of samples were successfully deobfuscated.

a) Static analysis techniques: We compared our tool to an existing static analysis technique, JStillery [29], finding that our tool can deobfuscate 86%-98% of malware, compared to 8%-42%. This is a significant increase in deobfuscation accuracy, and represents a large improvement in detection capability. Furthermore, we believe that our tool is more robust to new static evasion techniques because we are leveraging more concrete execution. Our deobfuscation tool can integrate well with existing static analysis techniques based on machine learning and static signatures, because our tool can output deobfuscated JavaScript.

b) Dynamic analysis: Our analysis, like other techniques [26], [28], [49], is shown to improve dynamic analysis by being able to execute more code. Common increases in code coverage include, for example, the following: code in event handlers, code branches that were not taken on previous executions, and client-side cloaking. Additionally, we find that increasing code coverage in our analysis can improve our detection capabilities by 15% over existing dynamic analysis in the web browser (Section VII-B).

c) Forced execution: Our analysis can additionally simulate forced execution, triggering code from specific user interaction and environment specific client-side cloaking [26], [28], [49]. Our analysis: does not modify server-side application state, and is more light-weight, but sacrifices some precision. Because our analysis is outside the web browser and isolated, our analysis will not modify server-side web application state. The drawback of our approach is that, because our analysis is built outside of the web browser, we may fail to deobfuscate code in a small amount of cases.

The deobfuscation engine as disclosed herein with respect to various embodiments has the capability to force execution, while at the same time, significantly reducing latency. We measure that we can return results in parallel for each script at an average of 855 ms for benign code, which makes up the vast majority of in-the-wild traffic, while at the same time our tool deobfuscates 86%-98% of malware. In contrast, we find that forced execution can give results on the order of 12 seconds on average [28]. Furthermore, in a real deployment, our analysis time would be significantly reduced by caching. Our analysis can cache the commonly reused libraries present in many web pages, such as jQuery; whereas a whole-page analysis based on dynamic forced execution executes the page again if any script inside the page has changed. We find that for in-the-wild traffic, this could improve performance by 9.9 times on average, measured over 7 days. Our analysis can also gracefully extend to extremely low-latency environments, whereas full page emulation cannot.

d) Rozzle: Compared to Rozzle [49], our analysis has several benefits and tradeoffs. First, our standalone analysis supports low-latency, inline network defense by being built outside of the web browser and is better able to enable caching. Additionally, because our analysis occurs outside the web browser, we have more control over our execution environment, allowing us to force execution in specific ways—triggering, for example, event handlers, callbacks, and timeout events, and performing speculative decoding and execution of in-memory code. A common application would be to use our tool to detect, for example, credit-card skimmers, which require specific user interaction—a user entering a valid credit card number—by modeling execution of an event handler with symbolic input. Our tool also does not connect to external servers, allowing us to more aggressively explore execution paths without harming benign web sites. Finally, we gracefully tolerate runtime errors, which other work has shown can limit detection accuracy [28].

The drawbacks to our approach compared to Rozzle are also similar to those of forced execution, arising from the fact that our analysis is not a perfect JavaScript environment and does not have access to the entire web browser environment.

3) Limitations: The results that we present here have some limitations. First, our success rate of deobfuscation on our datasets from VirusTotal may be influenced by different biases, due to the source, sampling methodology, and the time of collection. However, when we make comparisons with other static or dynamic analysis techniques, or between time periods, we believe these biases have less impact on our results. The biases likely impact both sides of the comparison similarly. Furthermore, we augment our findings from our labeled VirusTotal dataset with our data on in-the-wild detection in Section 7-B, which shows that our analysis can have real detection improvement in a production environment. Because all of the samples in the dataset have been detected by other vendors—by virtue of collecting malware samples from VirusTotal—these samples may be easier to detect than malware samples in the wild. Our VirusTotal samples may also be more popular than other malware samples, since vendors may focus on detecting widespread malware families over smaller scale attacks.

Additionally, because manually reverse engineering obfuscated malware is time-intensive, we were not able to manually analyze large portions of the data. To mitigate the influence that the small sample has on our measurement of our success rate, we calculated a 95% confidence interval of 78% and 93% of malware being correctly deobfuscated depending on the dataset time period-still very good results, and not appreciably different in magnitude from our estimate.

The influence of the small sample size has more impact on our measurement of reasons for our analysis to fail. While those findings are less reliable in terms of precise frequency measurements, the largest fundamental challenge we observed is imprecise modeling of the execution environment. Modeling the execution environment of JavaScript is challenging due to the huge amount of different embedded API calls. Our approach of by focusing on APIs commonly used by malware allows us to make the problem tractable, but can have false negatives when our analysis does not model specific APIs. Still, we show that our implementation currently has good coverage over existing malware. Cloaking interaction between DOM APIs that require HTML and JavaScript also presented a blocker for the majority of missed detections. Our disclosed deobfuscation engine models concrete DOM APIs when presented with a valid JavaScript and HTML pair, in some contexts, such as when analyzing JavaScript on the network, this information is not present. Even when simulating those contexts (Section 7-A), we show coverage of 86%-98% of malware.

We present results about different collections periods to determine how our results generalize to forward looking distributions of malware. Our two datasets are taken from a two specific time periods: January to April, and May to August of 2020. During development, we tested and developed using samples from our January to April dataset and production data. We did find some variation between these two time periods, measuring an 86% success rate in our earlier dataset compared to 98% in our later dataset. Some difference can be attributed to popular families of malware present in the January-April dataset, but not in the May-August dataset. We believe our technique does significantly generalize to new malware samples; indeed, our later dataset has a higher success rate than our earlier dataset, while we would expect a lower success rate because we designed our tool with better knowledge about earlier threats than newer threats. Nevertheless, we believe that our results show that our technique does substantially generalize to new and previously unknown malware samples as show by our high success rate across time periods.

9. Conclusion

We showed our analysis based on abstract interpretation can deobfuscate 86%-98% of obfuscated JavaScript and further showed how this engine can be used to detect malicious JavaScript. We find that it can deobfuscate more JavaScript than an existing static analysis tool [29]. Furthermore, our deobfuscation engine can respond fast enough for inline defenses, within an average of 33 ms, for 58% to 81% of malware. As future work, our analysis can compose well with existing signature-based and machine-learning techniques allowing us, for example, to: run signatures over deobfuscated JavaScript, train and evaluate machine learning models on deobfuscated content, and adding custom behavioral signatures on interpreted code over all code paths.

VI. EXAMPLE PROCESS EMBODIMENTS FOR DEOBFUSCATING AND DECLOAKING WEB-BASED MALWARE WITH ABSTRACT EXECUTION

Figure 6:
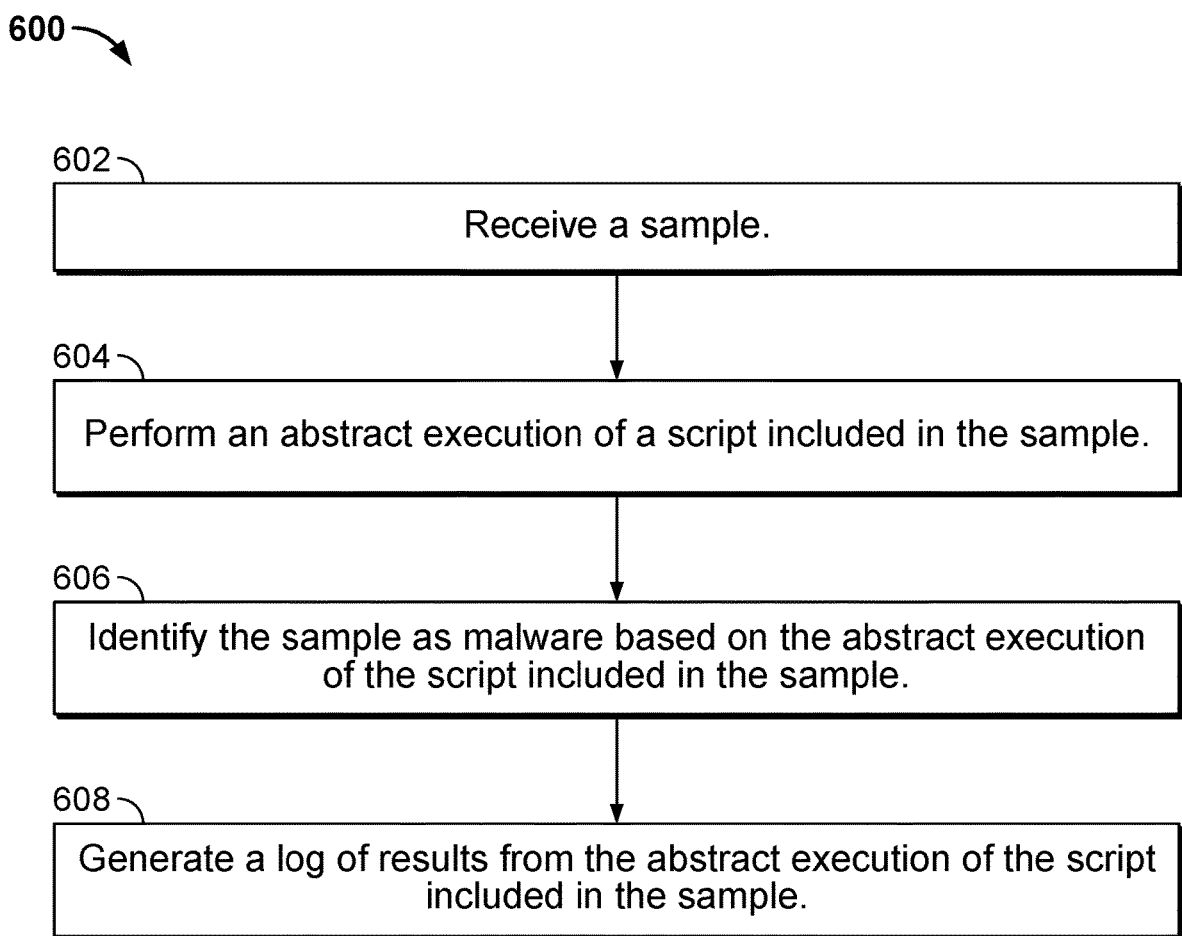
FIG. 6 illustrates an embodiment of a process for deobfuscating and decloaking malware based on abstract execution.

FIG. 6 illustrates an embodiment of a process for deobfuscating and decloaking malware based on abstract execution. In various embodiments, process 600 is performed by platform 122, and in particular by deobfuscation engine 400. In some embodiments, data appliance 102 (e.g., in malware analysis module 112, and similarly included in data appliances 114 and 116) includes deobfuscation engine 400 and similarly performs the disclosed processing for deobfuscating and decloaking malware based on abstract execution.

Process 600 begins at 602 when a sample is received.

At 604, an abstract execution (e.g., also referred to herein as abstract interpretation) of a script (e.g., JavaScript or another scripting/programming language) included in the sample is performed as similarly described above.

At 606, the sample is identified as malware based on the abstract execution of the script included in the sample as similarly described above.

At 608, a log of results is generated from the abstract execution of the script included in the sample as similarly described above.

Figure 7:
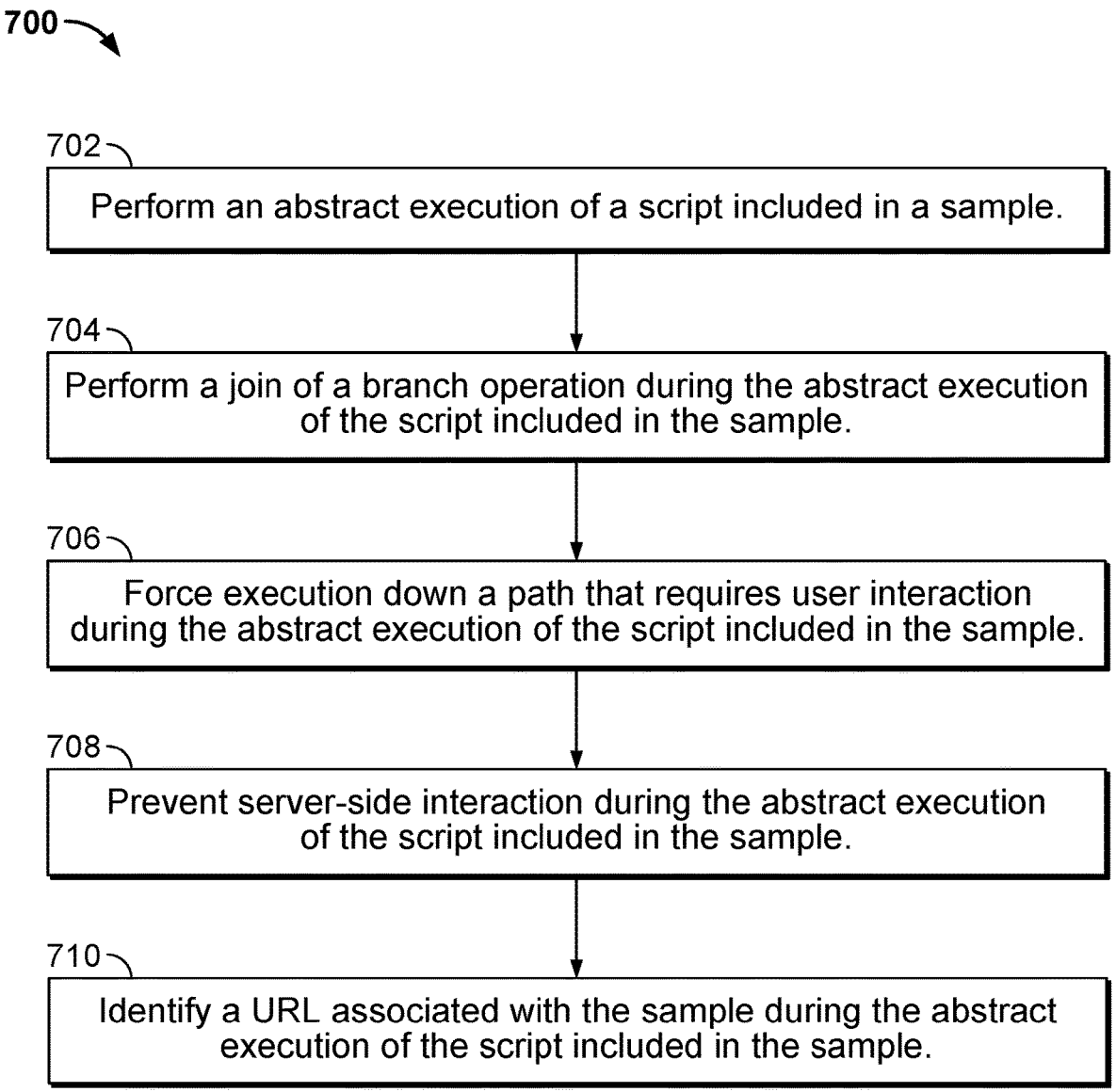
FIG. 7 illustrates another embodiment of a process for deobfuscating and decloaking malware based on abstract execution.

FIG. 7 illustrates another embodiment of a process for deobfuscating and decloaking malware based on abstract execution. In various embodiments, process 700 is performed by platform 122, and in particular by deobfuscation engine 400. In some embodiments, data appliance 102 (e.g., in malware analysis module 112, and similarly included in data appliances 114 and 116) includes deobfuscation engine 400 and similarly performs the disclosed processing for deobfuscating and decloaking malware based on abstract execution.

Process 700 begins at 702 when an abstract execution (e.g., also referred to herein as abstract interpretation) of a script (e.g., JavaScript or another scripting/programming language) included in the sample is performed as similarly described above.

At 704, a join of a branch operation during the abstract execution of the script included in the sample is performed as similarly described above.

At 706, forced execution down a path that requires user interaction during the abstract execution of the script included in the sample is performed as similarly described above.

At 708, server-side interaction is prevented during the abstract execution of the script included in the sample as similarly described above.

In some embodiments, the deobfuscation engine also performs speculative, in-memory decoding during the abstract execution of the script included in the sample, such as similarly described above.

In some embodiments, the deobfuscation engine also tolerates undefined functions and errors during the abstract execution of the script included in the sample, such as similarly described above.

At 710, a URL (e.g., a new URL) associated with the sample (e.g., which may at this point or a later point in the malware analysis be determined to be malware) is identified (e.g., and the URL can be extracted for further malware analysis and/or URL filtering if associated with the sample that is determined to be malware) during the abstract execution of the script included in the sample. For example, the URL can be extracted and sent to a cloud-based security service, a firewall, and/or a DNS security service for URL filtering and/or further malware URL analysis.

VII. REFERENCES

[1] P. Ducklin, "Ransomware in your inbox: the rise of malicious javascript attachments," nakedsecurity.sophos.com, 2016.
[2] L. Leal, "Malicious javascript used in wp site/home url redirects," blog.sucuri.net, 2020.
[3] Sophos, "Javascript malware finds new life,"
[4] A. Zaharia, "Javascript malware-a growing trend explained for everyday users," heimdalsecurity.com, 2016.
[5] B. Hunter, "Vipersoftx-new javascript threat," www.fortinet.com, 2020.
[6] TrendMicro, "Javascript malware in spam spreads ransomware, miners, spyware, worm," www.trendmicro.com, 2019.
[7] G. Bary, "Analyzing magecart malware—from zero to hero" www.perimeterx.com. 2020.
[8] W. Xu, F. Zhang, and S. Zhu, "The power of obfuscation techniques in malicious javascript code: A measurement study," in 2012 7$^{th}$ *International Conference on Malicious and Unwanted Software. IEEE,* 2012, pp. 9-16.
[9] S. Lekies, B. Stock, M. Wentzel, and M. Johns, "The unexpected dangers of dynamic javascript," in 24th {USENIX} *Security Symposium* ({USENIX} *Security* 15), 2015, pp. 723-735.
[10] G. Richards, C. Hammer, B. Burg, and J. Vitek, "The eval that men do," in *European Conference on Object-Oriented Programming.* Springer, 2011, pp. 52-78.
[11] P. Skolka, C.-A. Staicu, and M. Pradel, "Anything to hide? Studying minified and obfuscated code in the web," in *The World Wide Web Conference,* 2019, pp. 1735-1746.

[12] I. You and K. Yim, "Malware obfuscation techniques: A brief survey," in 2010 *International conference on broadband, wireless computing, communication and applications*. IEEE, 2010, pp. 297-300.
[13] M. Kleppe, "JSFuck," http://www.jsfuck.com/, 2012.
[14] "Javascript obfuscator," https://javascriptobfuscator.com/, 2019.
[15] "FREE JavaScript obfuscator," http://www.freejsobfuscator.com/, 2016.
[16] "Online javascript obfuscator," www.daftlogic.com, 2008.
[17] "JavaScript obfuscator tool," https://obfuscator.io/, 2017.
[18] "jfogs: Javascript code obfuscator," github.com, 2015.
[19] "JSObfu," github.com, 2014.
[20] A. Fass, M. Backes, and B. Stock, "Hidenoseek: Camouflaging malicious javascript in benign ASTs," in *Proceedings of the 2019 ACM SIGSAC Conference on Computer and Communications Security*, 2019, pp. 1899-1913.
[21] N. Papernot, P. McDaniel, S. Jha, M. Fredrikson, Z. B. Celik, and A. Swami, "The limitations of deep learning in adversarial settings," in 2016 *IEEE European symposium on security and privacy (EuroS&P)*. IEEE, 2016, pp. 372-387.
[22] X. Chen, J. Andersen, Z. M. Mao, M. Bailey, and J. Nazario, "Towards an understanding of anti-virtualization and anti-debugging behavior in modern malware," in 2008 *IEEE international conference on dependable systems and networks with FTCS and DCC (DSN)*. IEEE, 2008, pp. 177-186.
[23] A. Kapravelos, Y. Shoshitaishvili, M. Cova, C. Kruegel, and G. *Vigna*, "Revolver: An automated approach to the detection of evasive web-based malware," in 22*nd {USENIX} Security Symposium ({USENIX} Security* 13), 2013, pp. 637-652.
[24] K. Sen, S. Kalasapur, T. Brutch, and S. Gibbs, "Jalangi: a selective record-replay and dynamic analysis framework for javascript," in *Proceedings of the 2013 9th Joint Meeting on Foundations of Software Engineering*, 2013, pp. 488-498.
[25] G. Li, E. Andreasen, and I. Ghosh, "Symjs: automatic symbolic testing of javascript web applications," in *Proceedings of the 22$^{nd}$ ACM SIGSOFT International Symposium on Foundations of Software Engineering*, 2014, pp. 449-459.
[26] K. Kim, I. L. Kim, C. H. Kim, Y. Kwon, Y. Zheng, X. Zhang, and D. Xu, "J-force: Forced execution on javascript," in *Proceedings of the 26th international conference on World Wide Web*, 2017, pp. 897-906.
[27] Z. Tang, J. Zhai, M. Pan, Y. Aafer, S. Ma, X. Zhang, and J. Zhao, "Dual-force: understanding webview malware via cross-language forced execution," in *Proceedings of the 33rd ACM/IEEE International Conference on Automated Software Engineering*, 2018, pp. 714-725.
[28] X. Hu, Y. Cheng, Y. Duan, A. Henderson, and H. Yin, "Jsforce: A forced execution engine for malicious javascript detection," in *Security and Privacy in Communication Networks*, X. Lin, A. Ghorbani, K. Ren, S. Zhu, and A. Zhang, Eds., 2018, pp. 704-720.
[29] S. Di Paola, "Advanced js deobfuscation via ast and partial evaluation," blog.mindedsecurity.com.
[30] "box.js," 2017.
[31] Y. Project, "Yara rules," github.com.
[32] B. Stock, B. Livshits, and B. Zorn, "Kizzle: A signature compiler for exploit kits," in *International Conference on Dependable Systems and Networks*, 2015.

[33] C. Curtsinger, B. Livshits, B. G. Zorn, and C. Seifert, "Zozzle: Fast and precise in-browser javascript malware detection." in *USENIX security symposium*. San Francisco, 2011, pp. 33-48.
[34] S. Kaplan, B. Livshits, B. Zorn, C. Seifert, and C. Curtsinger, "NOFUS: Automatically detecting String.fromCharCode(32)+" obfuscated". toLowerCase ( )x" javascript code"." *Technical Report MSR-TR-*2011-57*, Microsoft Research*, 2011.
[35] P. Likarish, E. Jung, and I. Jo, "Obfuscated malicious javascript detection using classification techniques," in 2009 4*th International Conference on Malicious and Unwanted Software (MALWARE)*. IEEE, 2009, pp. 47-54.
[36] B. Tellenbach, S. Paganoni, and M. Rennhard, "Detecting obfuscated javascripts from known and unknown obfuscators using machine learning," *International Journal on Advances in Security*, vol. 9, no. 3/4, pp. 196-206, 2016.
[37] A. Fass, R. P. Krawczyk, M. Backes, and B. Stock, "JaSt: Fully syntactic detection of malicious (obfuscated) javascript," in *International Conference on Detection of Intrusions and Malware, and Vulnerability Assessment*. Springer, 2018, pp. 303-325.
[38] J. Wang, Y. Xue, Y. Liu, and T. H. Tan, "JSDC: A hybrid approach for javascript malware detection and classification," in *Proceedings of the 10th ACM Symposium on Information, Computer and Communications Security*, 2015, pp. 109-120.
[39] Y. Wang, W.-d. Cai, and P.-c. Wei, "A deep learning approach for detecting malicious javascript code," *Security and Communication Networks*, vol. 9, no. 11, pp. 1520-1534, 2016.
[40] R. Sommer and V. Paxson, "Outside the closed world: On using machine learning for network intrusion detection," in 2010 *IEEE symposium on security and privacy*. IEEE, 2010, pp. 305-316.
[41] O. Suciu, S. E. Coull, and J. Johns, "Exploring adversarial examples in malware detection," in 2019 *IEEE Security and Privacy Workshops (SPW)*. IEEE, 2019, pp. 8-14.
[42] G. Lu and S. Debray, "Automatic simplification of obfuscated javascript code: A semantics-based approach," in 2012 *IEEE Sixth International Conference on Software Security and Reliability*. IEEE, 2012, pp. 31-40.
[43] W. Xu, F. Zhang, and S. Zhu, "Jstill: mostly static detection of obfuscated malicious javascript code," in *Proceedings of the third ACM conference on Data and application security and privacy*, 2013, pp. 117-128.
[44] O. Tripp, P. Ferrara, and M. Pistoia, "Hybrid security analysis of web javascript code via dynamic partial evaluation," 2014 *International Symposium on Software Testing and Analysis, ISSTA 2014—Proceedings*, July 2014.
[45] A. Kapravelos, C. Grier, N. Chachra, C. Kruegel, G. *Vigna*, and V. Paxson, "Hulk: Eliciting malicious behavior in browser extensions," in 23*rd {USENIX} Security Symposium ({USENIX} Security* 14), 2014, pp. 641-654.
[46] L. Invernizzi, K. Thomas, A. Kapravelos, O. Comanescu, J. Picod, and E. Bursztein, "Cloak of visibility: Detecting when machines browse a different web," in 2016 *IEEE Symposium on Security and Privacy (SP)*, 2016, pp. 743-758.
[47] A. Fass, M. Backes, and B. Stock, "JSTAP: A Static Pre-Filter for Malicious JavaScript Detection," in *Proceedings of the Annual Computer Security Applications Conference (ACSAC)*, 2019.
[48] D. Canali, M. Cova, G. *Vigna*, and C. Kruegel, "Propheler: a fast filter for the large-scale detection of malicious web pages," in *Proceedings of the 20th International Conference on World Wide Web*, 2011, pp. 197-206.
[49] C. Kolbitsch, B. Livshits, B. Zorn, and C. Seifert, "Rozzle: De-cloaking internet malware," in 2012 *IEEE Symposium on Security and Privacy*. IEEE, 2012, pp. 443-457.
[50] A. Jordan, F. Gauthier, B. Hassanshahi, and D. Zhao, "Unacceptable behavior: Robust pdf malware detection using abstract interpretation," in *Proceedings of the 14th ACM SIGSAC Workshop on Programming Languages and Analysis for Security*, 2019, pp. 19-30.
[51] A. Valmari, "The state explosion problem," in *Advanced Course on Petri Nets*. Springer, 1996, pp. 429-528.
[52] T. C. Project, "The closure compiler," developers-.google.com, 2020.
[53] M. Laverdet, "isolated-vm-access to multiple isolates in nodejs," github.com, 2017.
[54] V. L. Pochat, T. van Goethem, S. Tajalizadehkhoob, M. Korczynski, and W. Joosen, "Tranco: A research-oriented top sites ranking hardened against manipulation," in *26th Annual Network and Distributed System Security Symposium, NDSS* 2019, San Diego, California, USA, Feb. 24-27, 2019. The Internet Society, 2019. [Online]. Available: www.ndss-symposium.org.
[55] "VirusTotal," www.virustotal.com.
[56] prop.test: Test of Equal or Given Proportions," www.r-documentation.org.
[57] E. B. Wilson, "Probable inference, the law of succession, and statistical inference," Journal of the American Statistical Association, vol. 22, no. 158, pp. 209-212, 1927. [Online]. Available: www.jstor.org.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for deobfuscating malware with abstract execution, comprising:
 a processor; and
 a memory coupled to the processor and stores instructions executed by the processor configured to:
  receive a sample;
  perform an abstract execution of a script included in the sample, comprising to:
   parse the script to generate an abstract syntax tree;
   select a function of the abstract syntax tree; and
   build, for the selected function, a control flow graph for analysis of all branches of the abstract syntax tree, comprising to:
    for a node that remains to be analyzed of the abstract syntax tree:
     determine that the node corresponds to an unknown branch point;
     in response to a determination that the node corresponds to the unknown branch point, add both side of the node to a set of nodes that remains to be analyzed;
     determine whether a loop exists based on the set of nodes that remains to be analyzed; and
     in response to a determination that the loop exists, unroll the loop to predict an exact control flow within the function;
  identify the sample as malware based on the abstract execution of the script included in the sample;
  generate a log of results from the abstract execution of the script included in the sample;
  determine whether the sample is malicious based on the generated log of results from the abstract execution of the script included in the sample; and
  in response to a determination that the sample is malicious, generate a signature to detect a new malware family.

2. The system of claim 1, wherein the sample includes JavaScript.

3. The system of claim 1, wherein the abstract execution of the script included in the sample is performed using a deobfuscation engine that is outside of a web browser to facilitate a standalone script analysis.

4. The system of claim 1, wherein the processor is further configured to perform a join of a branch operation during the abstract execution of the script included in the sample.

5. The system of claim 1, wherein the processor is further configured to force execution down a path that requires user interaction during the abstract execution of the script included in the sample.

6. The system of claim 1, wherein the processor is further configured to prevent server-side interaction during the abstract execution of the script included in the sample.

7. The system of claim 1, wherein the processor is further configured to perform speculative, in-memory decoding during the abstract execution of the script included in the sample.

8. The system of claim 1, wherein the processor is further configured to tolerate undefined functions and errors during the abstract execution of the script included in the sample.

9. The system of claim 1, wherein the processor is further configured to identify a URL associated with the sample and send the URL to a cloud-based security service.

10. The system of claim 1, wherein the processor is further configured to identify a URL associated with the sample and send the URL to a firewall.

11. The system of claim 1, wherein the processor is further configured to identify a URL associated with the sample and send the URL to a DNS security service.

12. A method for deobfuscating malware with abstract execution, comprising:
 receiving a sample;
 performing an abstract execution of a script included in the sample, comprising:
  parsing the script to generate an abstract syntax tree;
  selecting a function of the abstract syntax tree; and
  building, for the selected function, a control flow graph for analysis of all branches of the abstract syntax tree, comprising:
   for a node that remains to be analyzed of the abstract syntax tree:
    determining that the node corresponds to an unknown branch point;
    in response to a determination that the node corresponds to the unknown branch point, adding both side of the node to a set of nodes that remains to be analyzed;
    determining whether a loop exists based on the set of nodes that remains to be analyzed; and
    in response to a determination that the loop exists, unrolling the loop to predict an exact control flow within the function;
 identifying the sample as malware based on the abstract execution of the script included in the sample;
 generating a log of results from the abstract execution of the script included in the sample;

determining whether the sample is malicious based on the generated log of results from the abstract execution of the script included in the sample; and in response to a determination that the sample is malicious, generating a signature to detect a new malware family.

13. The method of claim 12, wherein the sample includes JavaScript.

14. The method of claim 12, wherein the abstract execution of the script included in the sample is performed using a deobfuscation engine that is outside of a web browser to facilitate a standalone script analysis.

15. A computer program product for deobfuscating malware with abstract execution, the computer program product being embodied in a non-transitory computer readable storage medium and comprising computer instructions for:

receiving a sample;

performing an abstract execution of a script included in the sample, comprising:

parsing the script to generate an abstract syntax tree;

selecting a function of the abstract syntax tree; and building, for the selected function, a control flow graph for analysis of all branches of the abstract syntax tree, comprising:

for a node that remains to be analyzed of the abstract syntax tree:

determining that the node corresponds to an unknown branch point;

in response to a determination that the node corresponds to the unknown branch point, adding both side of the node to a set of nodes that remains to be analyzed;

determining whether a loop exists based on the set of nodes that remains to be analyzed; and in response to a determination that the loop exists, unrolling the loop to predict an exact control flow within the function;

identifying the sample as malware based on the abstract execution of the script included in the sample;

generating a log of results from the abstract execution of the script included in the sample;

determining whether the sample is malicious based on the generated log of results from the abstract execution of the script included in the sample; and in response to a determination that the sample is malicious, generating a signature to detect a new malware family.

16. The computer program product of claim 15, wherein the sample includes JavaScript.

17. The computer program product of claim 15, wherein the abstract execution of the script included in the sample is performed using a deobfuscation engine that is outside of a web browser to facilitate a standalone script analysis.

* * * * *